(12) United States Patent
Ribeiro et al.

(10) Patent No.: US 11,767,078 B2
(45) Date of Patent: Sep. 26, 2023

(54) DRIVE ARRANGEMENT FOR A BICYCLE

(71) Applicant: SRAM DEUTSCHLAND GmbH, Schweinfurt (DE)

(72) Inventors: Bruno Ribeiro, Aveiro (PT); Pedro Santos, Coimbra (PT); Diogo Silva, Coimbra (PT); Matthias Reinbold, Würzburg (DE); Henrik Braedt, Hambach (DE); Jorge Latimer, San Luis Obispo, CA (US); John Collen, San Luis Obispo, CA (US)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 392 days.

(21) Appl. No.: 16/779,084

(22) Filed: Jan. 31, 2020

(65) Prior Publication Data
US 2020/0247503 A1 Aug. 6, 2020

Related U.S. Application Data

(60) Provisional application No. 62/801,608, filed on Feb. 5, 2019.

(51) Int. Cl.
*B62M 9/06* (2006.01)
*F16H 55/30* (2006.01)
(Continued)

(52) U.S. Cl.
CPC ............... *B62M 9/06* (2013.01); *B62M 1/36* (2013.01); *B62M 9/124* (2013.01); *B62M 9/16* (2013.01);
(Continued)

(58) Field of Classification Search
CPC ........... F16G 13/06; B62M 9/10; B62M 9/00; B62M 2009/005; B62M 9/06; B62M 1/36;
(Continued)

(56) References Cited

U.S. PATENT DOCUMENTS 4,174,642 A * 11/1979 Martin .................... F16H 55/30
474/152
4,186,617 A * 2/1980 Avramidis .............. F16G 13/06
474/229
(Continued)

FOREIGN PATENT DOCUMENTS

CN 108019461 5/2018
CN 108657370 10/2018
(Continued)

OTHER PUBLICATIONS

Huang, James; 2019 SRAM Red eTap goes 12-speed, Webpage: https://cyclingtips.com/2018/11 /2019-sram-red-etap-goes-12-speed/ (last checked Mar. 3, 2023).
(Continued)

*Primary Examiner* — Henry Y Liu

(57) ABSTRACT

A drive arrangement for a bicycle may be provided with various interactive components configured to reliably and repeatably engage and disengage with one another both when new and after a period of wear. The drive arrangement may include a drive sprocket assembly connected to a driven sprocket assembly with a chain movable by a gear changer.

7 Claims, 19 Drawing Sheets

(51) Int. Cl.
*F16G 13/06* (2006.01)
*F16H 55/08* (2006.01)
*B62M 9/124* (2010.01)
*B62M 1/36* (2013.01)
*B62M 9/16* (2006.01)
*F16H 9/24* (2006.01)
*B62M 9/00* (2006.01)

(52) U.S. Cl.
CPC ............... *F16G 13/06* (2013.01); *F16H 9/24* (2013.01); *F16H 55/088* (2013.01); *F16H 55/30* (2013.01); *B62M 2009/005* (2013.01)

(58) Field of Classification Search
CPC . B62M 9/124; B62M 9/16; F16H 9/24; F16H 55/088; F16H 55/30
USPC .................. 474/206, 226, 230, 231, 156
See application file for complete search history.

(56) References Cited

U.S. PATENT DOCUMENTS

| | | | | |
|---|---|---|---|---|
| 4,265,134 A * | 5/1981 | Dupoyet | ................. | F16G 13/06 59/8 |
| 4,596,539 A * | 6/1986 | Yamasaki | ................. | B62M 9/10 474/206 |
| 4,642,078 A * | 2/1987 | Dupoyet | ................. | F16G 13/06 474/206 |
| 4,741,725 A * | 5/1988 | Ingold | ................. | B62M 9/12 474/212 |
| 5,066,265 A * | 11/1991 | Wu | ................. | F16G 13/06 474/212 |
| 5,073,153 A * | 12/1991 | Wu | ................. | F16G 13/06 474/212 |
| 5,098,349 A * | 3/1992 | Wu | ................. | F16G 13/06 474/206 |
| 5,741,196 A * | 4/1998 | Campagnolo | ........... | F16G 13/06 474/209 |
| 7,325,391 B1 * | 2/2008 | Oishi | ................. | F16G 13/06 59/5 |
| 7,712,298 B1 * | 5/2010 | Wang | ................. | F16G 13/06 59/5 |
| 8,734,280 B2 * | 5/2014 | Oishi | ................. | F16G 13/06 474/230 |
| 9,255,624 B2 * | 2/2016 | Fukumori | ................. | F16G 13/06 |
| 9,303,725 B2 * | 4/2016 | Fukumori | ................. | B62M 9/00 |
| 9,303,726 B2 * | 4/2016 | Fukumori | ................. | F16G 13/06 |
| 9,541,159 B2 * | 1/2017 | Wang | ................. | F16G 13/06 |
| 9,581,229 B2 * | 2/2017 | Pfeiffer | ................. | B62M 9/105 |
| 9,581,230 B2 * | 2/2017 | Pfeiffer | ................. | F16H 55/30 |
| 9,625,027 B2 * | 4/2017 | Pfeiffer | ................. | B62M 9/10 |
| 9,964,196 B2 * | 5/2018 | Sugimoto | ................. | F16H 55/30 |
| 10,247,291 B2 * | 4/2019 | Akanishi | ................. | F16H 55/303 |
| 10,295,041 B2 * | 5/2019 | Akanishi | ................. | F16H 55/30 |
| 10,352,397 B2 * | 7/2019 | Kamada | ................. | B62M 9/10 |
| 10,359,106 B2 * | 7/2019 | Akanishi | ................. | B62M 9/10 |
| 10,371,234 B2 * | 8/2019 | Civiero | ................. | F16G 13/06 |
| 10,378,637 B2 * | 8/2019 | Ooishi | ................. | B62M 9/10 |
| 10,533,633 B2 * | 1/2020 | Dos Santos | ............. | F16G 13/06 |
| 10,577,050 B2 * | 3/2020 | Akanishi | ................. | B62M 9/12 |
| 10,578,201 B2 * | 3/2020 | Reiter | ................. | F16H 57/01 |
| 11,300,192 B2 * | 4/2022 | Staples | ................. | F16H 55/30 |
| 2005/0020394 A1 * | 1/2005 | Valle | ................. | B62M 9/00 474/155 |
| 2009/0017951 A1 * | 1/2009 | Tohara | ................. | F16G 13/04 474/231 |
| 2009/0111626 A1 * | 4/2009 | Tohara | ................. | F16H 57/05 474/91 |
| 2009/0247337 A1 * | 10/2009 | Sakura | ................. | F16H 7/06 474/156 |
| 2012/0322599 A1 * | 12/2012 | Oishi | ................. | F16G 13/06 474/230 |
| 2013/0139642 A1 * | 6/2013 | Reiter | ................. | F16H 55/30 74/594.2 |
| 2013/0184110 A1 * | 7/2013 | Reiter | ................. | F16H 55/30 474/152 |
| 2013/0196803 A1 * | 8/2013 | Bodensteiner | .......... | F16G 13/06 474/140 |
| 2015/0226305 A1 * | 8/2015 | Pfeiffer | ................. | B62M 9/105 474/152 |
| 2015/0226308 A1 * | 8/2015 | Pfeiffer | ................. | B62M 9/105 474/152 |
| 2016/0169324 A1 * | 6/2016 | Wu | ................. | F16G 13/06 474/206 |
| 2016/0304161 A1 * | 10/2016 | Shirai | ................. | B62M 9/16 |
| 2018/0194433 A1 * | 7/2018 | Dos Santos | ............. | B62M 9/00 |
| 2018/0202531 A1 * | 7/2018 | Ooishi | ................. | B62M 9/10 |
| 2018/0313432 A1 * | 11/2018 | Ribeiro | ................. | F16G 13/06 |
| 2019/0031288 A1 | 1/2019 | Kamada | | |

FOREIGN PATENT DOCUMENTS

| | | |
|---|---|---|
| EP | 0522984 | 1/1993 |
| EP | 2684790 | 1/2014 |
| EP | 2535616 | 12/2015 |
| EP | 3342698 | 7/2018 |
| EP | 3381788 | 10/2018 |
| JP | H2169383 | 6/1990 |
| TW | 201823096 | 7/2018 |
| TW | 201834922 | 10/2018 |

OTHER PUBLICATIONS

SRAM; Connection: SRAM's Portuguese Chain Manufacturing Facility; Webpage: https://www.pinkbike.com/news/connection-an-introduction-to-srams-coimbra-family.html (last checked Mar. 3, 2023).

* cited by examiner

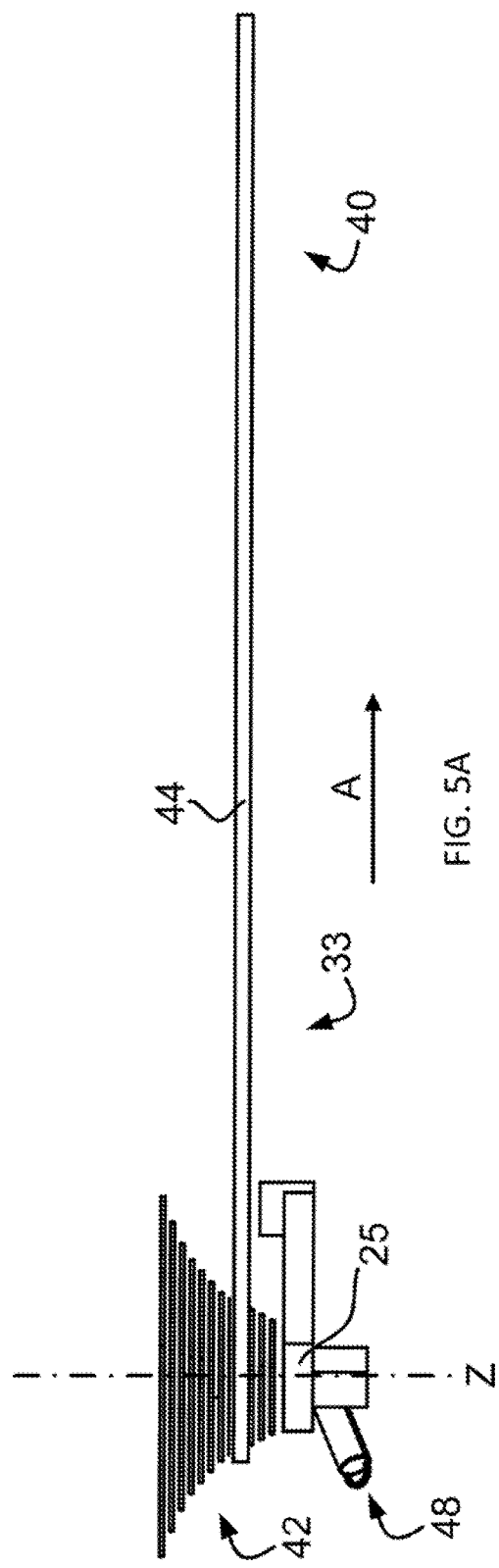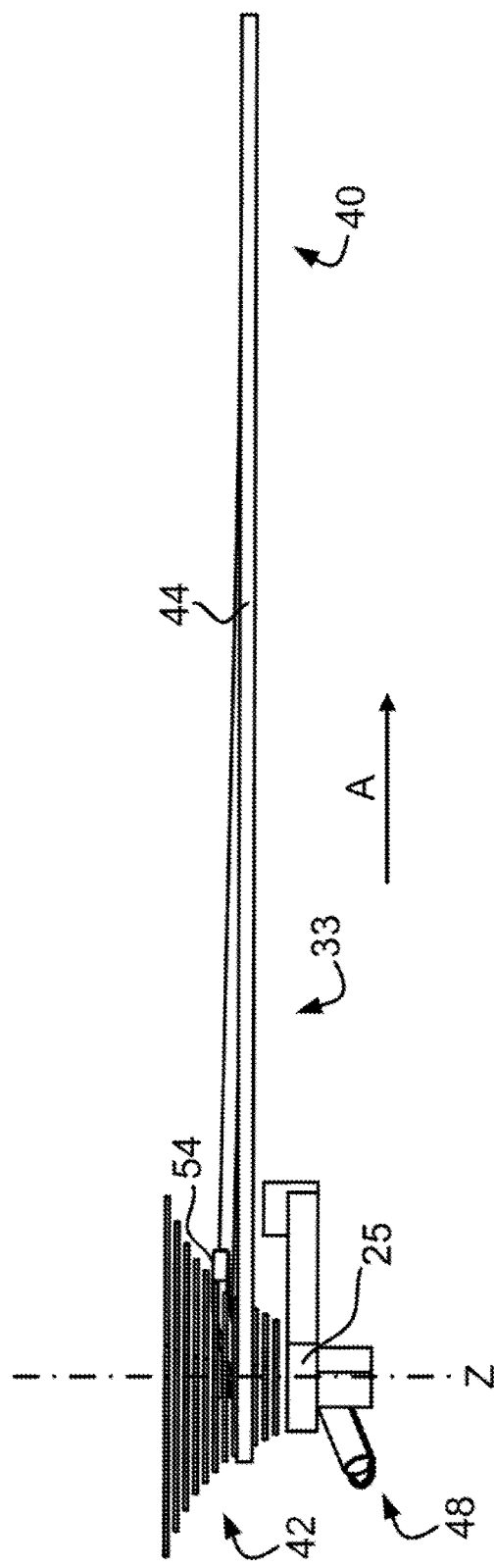

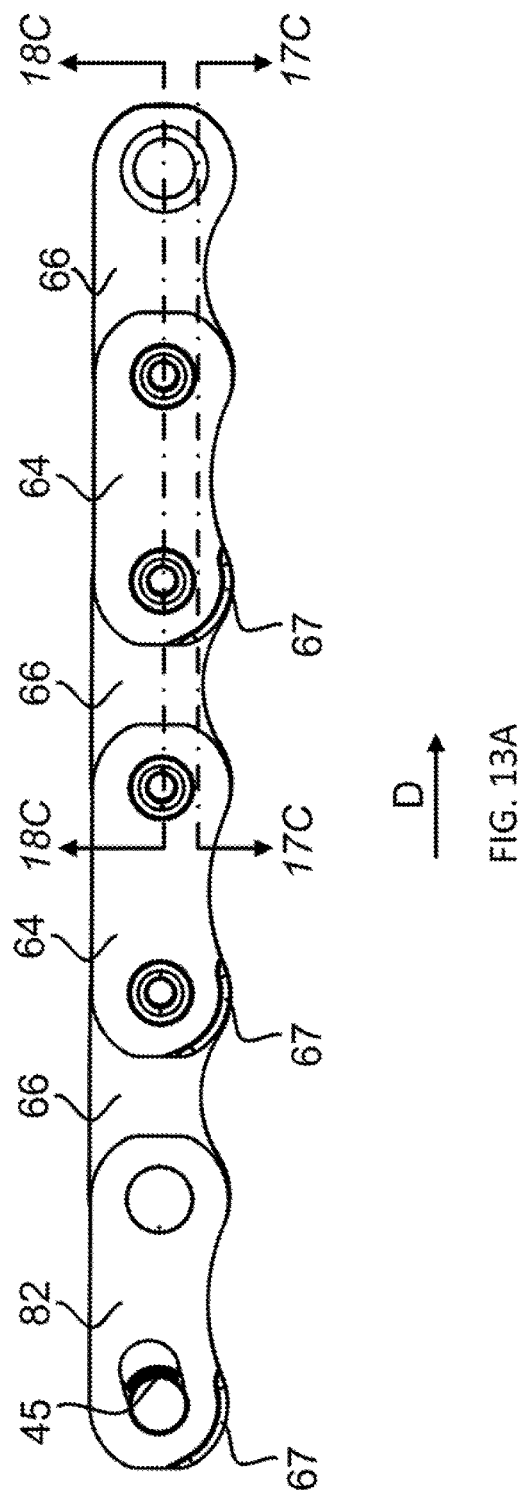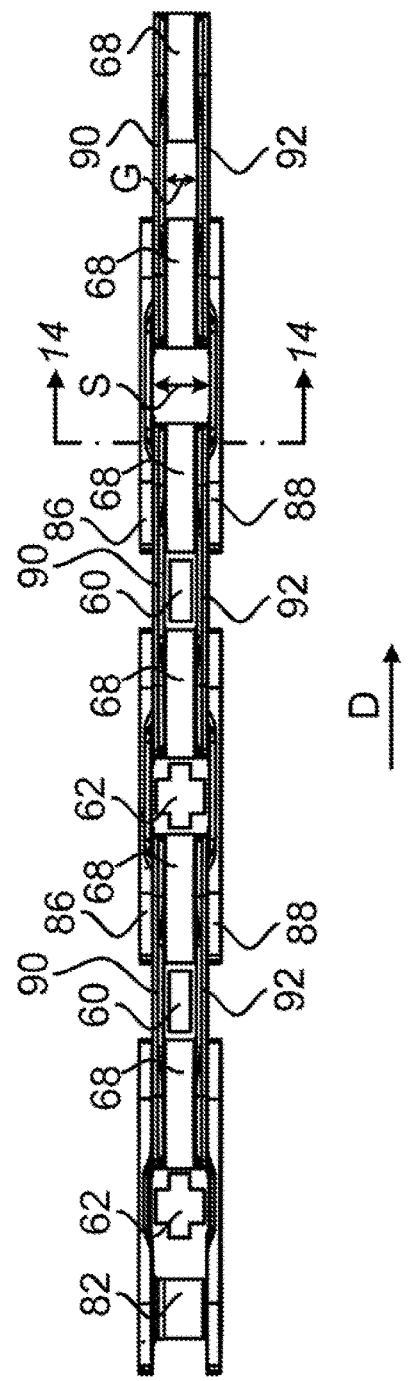
FIG. 13A
FIG. 13B

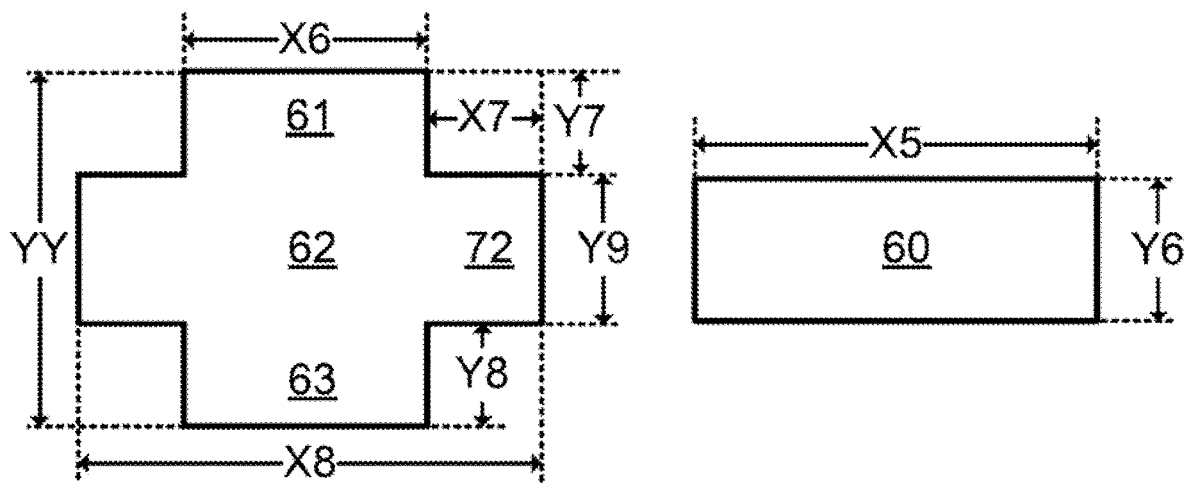
FIG. 18A
FIG. 18B
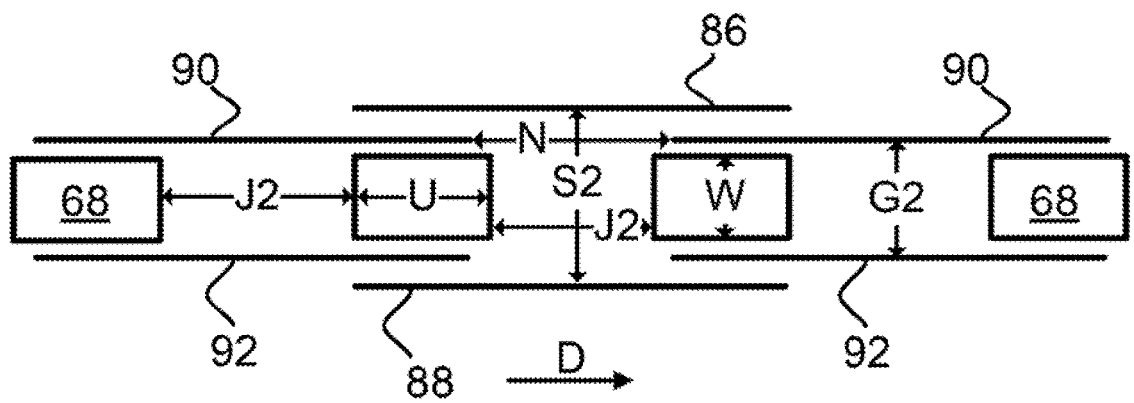
FIG. 18C
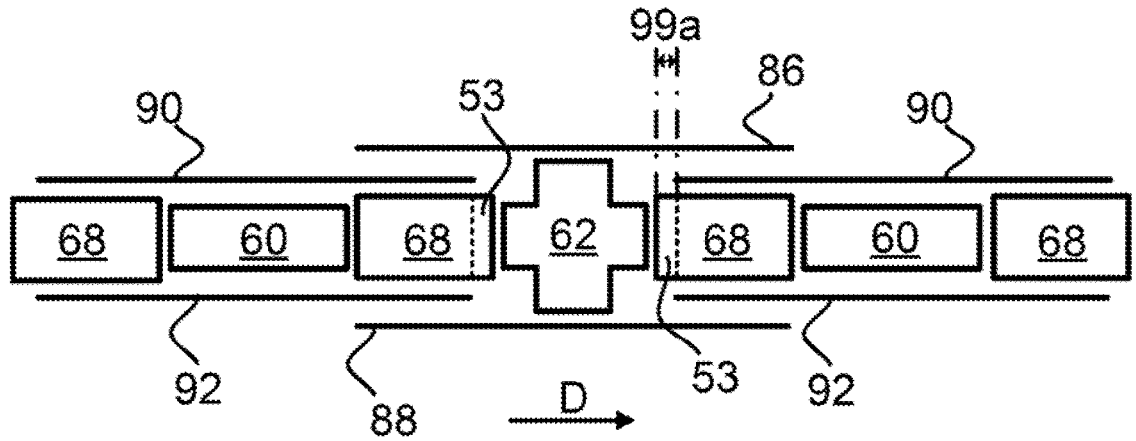
FIG. 18D

DRIVE ARRANGEMENT FOR A BICYCLE

RELATED APPLICATION DATA

This patent is related to and claims priority benefit of prior filed U.S. provisional application Ser. No. 62/801,608, filed Feb. 5, 2019. The entire contents of these prior filed applications are hereby incorporated herein by reference.

BACKGROUND

Field of the Disclosure

The present disclosure relates to a drive arrangement for a bicycle. Specifically, the disclosure describes a multi-ratio chain-driven drive arrangement, for instance in an external derailleur configuration. A chain is described to move between sprockets to change ratios and to maintain connection between sprockets to drive the bicycle.

Background of the Invention

A bicycle may be equipped with a drive arrangement. For example, a crank assembly may be provided to transmit torque from a rider to a drive sprocket assembly. The drive sprocket assembly may have one or more drive sprockets. The drive sprocket assembly may transmit torque to a driven sprocket assembly through a chain. For example, the driven sprocket assembly may have a plurality of sprockets rotatable about a rear wheel axis and configured to engage the chain. The driven sprocket assembly may be rotationally fixed to a rear wheel in at least one rotational direction. The driven sprocket assembly may be configured to rotate freely in a direction opposite forward rotation of the rear wheel, thus allowing a rider to continue forward progress while not operating the crank assembly.

Chain retention is important to maintain operation of the drive arrangement. Tension on the chain between the drive sprocket assembly and the driven sprocket assembly may help chain retention. However, if a rider does not pedal and the driven sprocket assembly freewheels relative to the rear wheel as described above then tension on the chain may be decreased leading to greater likelihood of unintentional chain derailment.

Chain retention features may be employed. For example, the drive arrangement may be sized and shaped to limit free space between teeth of the drive sprocket assembly and link plates of the chain. Optimizing ratios of tooth sizes filling distances between chain rollers and link plates may balance desired chain retention qualities with undesirable chain retention qualities, such as what is commonly known as chain suck. However, many current drive arrangement configurations do not provide adequate chain retention and/or have undesirable problems such as chain suck either when new or once the drive arrangement has achieved a minimum level of wear.

Shifting properties are another consideration of drive arrangements. Chain shifting may be controlled mechanically, as through a Bowden cable; electronically, as through wired or wireless communication protocols; hydraulically, as through an open or closed system; or with similar methods or combinations of methods. Shifting properties also factor into optimizing drive arrangement geometries. For example, similar ratios of tooth sizes and chain distances may be balanced to allow for adequate chain skew between drive sprockets and driven sprockets offset along a crank axis while also allowing for a gear changer to precisely shift the chain along the crank axis. Especially with a trend towards a greater number of driven sprockets disposed over a greater total axial distance and/or axially closer to adjacent sprockets, many current drive arrangement configurations do not provide adequate shifting precision and/or axial range.

SUMMARY

An object of this disclosure is to describe various drive arrangements configured to control interaction among components to optimize chain retention, controlled chain release, and shifting precision, and shifting axial range. Specific relationships between components of the drive arrangement may be configured to optimize these qualities when the drive arrangement is new and/or when the drive arrangement has worn to a degree. For example, components may be designed to wear at similar rates. Components may be designed with wear-specific features and/or cooperative features to spread load and thus wear.

One aspect of the invention provides a drive arrangement for a bicycle having a crank rotatable about a crank axis and having a crank mounting portion. A drive sprocket, having a sprocket mounting portion attached to the crank mounting portion and a chain engaging portion is provided. The chain engaging portion has a plurality of thin teeth and a plurality of thick teeth. Each of the plurality of thick teeth has a load feature, a guiding tip disposed radially outward of the load feature, and a recess area. The recess area is bounded by a line extending in a first radial direction from the crank axis through a radially outermost extent of the load feature; a circumference defined by a radial distance of a radially outermost extent of the guiding tip from the crank axis; and an outer profile of the guiding tip between the radially outermost extent of the load feature and the radially outermost extent of the guiding tip. The drive arrangement has a chain configured to engage with the chain engaging portion of the drive sprocket. The chain has a plurality of outer link plates; a plurality of rollers, each of the plurality of rollers disposed axially between a pair of the plurality of outer link plates relative to a roller axis; and a plurality of inner link plates disposed axially between the plurality of outer link plates and the plurality of rollers relative to the roller axis, wherein each of the plurality of inner link plates has a load chamfer sized and shaped to extend beyond a corresponding one of the plurality of rollers beyond the load feature of the corresponding one of the plurality of thick teeth in a second radial direction relative to the roller axis during drivetrain engagement; and a clearance feature sized and shaped to allow the corresponding one of the plurality of rollers to align with or protrude past the clearance feature in a third radial direction of the load chamfer relative to the roller axis during drivetrain engagement.

Another aspect of the invention provides a drive arrangement for a bicycle having a crank rotatable about a crank axis in a circumferential drive direction and having a crank mounting portion; and a drive sprocket, having a sprocket mounting portion attached to the crank mounting portion; a chain engaging portion, having a plurality of thin teeth; a plurality of thick teeth, each of the plurality of thick teeth having a load feature; and a guiding tip disposed radially outward of the load feature. Each of the plurality of thick teeth has an axial protrusion disposed circumferentially beyond the load feature in a circumferential direction opposite the drive direction. The drive arrangement has a chain configured to engage with the chain engaging portion of the drive sprocket. The chain has a plurality of outer link plates and a plurality of rollers. Each of the plurality of rollers is disposed axially between a pair of the plurality of outer link plates relative to a roller axis. The chain has a plurality of inner link plates disposed axially between the plurality of outer link plates and the plurality of rollers relative to the roller axis, wherein each of the plurality of inner link plates comprises a load feature receiving portion, and wherein a load feature width fills at least 70% of an inner axial distance defined between the load feature receiving portion of a first paired inner link plate and the load feature receiving portion of a second paired inner link plate of the plurality of inner link plates.

Yet another aspect of the invention provides a drive arrangement for a bicycle having a crank rotatable about a crank axis in a circumferential drive direction and having a crank mounting portion and a drive sprocket. The drive sprocket has a sprocket mounting portion attached to the crank mounting portion and a chain engaging portion. The chain engaging portion has a plurality of thin teeth and a plurality of thick teeth, each of the plurality of thick teeth having a load feature; and a guiding tip disposed radially outward of the load feature. Each of the plurality of thick teeth has an axial protrusion disposed circumferentially beyond the load feature in a circumferential direction opposite the drive direction. The drive arrangement has a driven sprocket assembly comprising at least twelve (12) driven sprockets and a gear changer. The gear changer has a guide pulley; a tension pulley rotatable about a tensioning axis; and a fluid damper assembly. The fluid damper assembly has a flow path configured to facilitate flow from a first chamber to a second chamber at a first flow rate; and a valve configured to facilitate flow from the second chamber to the first chamber at a second flow rate greater than the first flow rate. The drive arrangement has a chain configured to engage with the chain engaging portion of the drive sprocket and with the driven sprocket assembly, the chain having a plurality of outer link plates; a plurality of rollers, each of the plurality of rollers disposed axially between a pair of the plurality of outer link plates relative to a roller axis; and a plurality of inner link plates disposed axially between the plurality of outer link plates and the plurality of rollers relative to the roller axis, wherein each of the plurality of inner link plates comprises a load feature receiving portion, and wherein a load feature width fills at least 70% of an inner axial distance defined between the load feature receiving portion of a first paired inner link plate and the load feature receiving portion of a second paired inner link plate of the plurality of inner link plates.

BRIEF DESCRIPTION OF THE DRAWINGS

FIG. 5A is a top schematic view of the drive arrangement of FIG. 4 in a driving state;

FIG. 5B is a top schematic view of the drive arrangement of FIG. 4 in a shifting state;

FIG. 13A is an outboard side view of a chain of a drive arrangement;

FIG. 13B is a top view of the chain of FIG. 13A depicting schematic representations of teeth of a drive sprocket in engagement with the chain;

FIG. 18A is a sectional schematic view of a thick tooth of the drive sprocket of FIG. 9 taken along line 18A-18A;

FIG. 18B is a sectional schematic view of a thin tooth of the drive sprocket of FIG. 9 taken along line 18B-18B;

FIG. 18C is a sectional schematic view of the chain of FIG. 13A along line 18C-18C and corresponding to the sectional schematic views of FIG. 18A and FIG. 18B;

FIG. 18D is the sectional schematic view of FIG. 18C combined with the sectional schematic view of FIG. 18A and FIG. 18B.

Other aspects and advantages of the embodiments disclosed herein will become apparent upon consideration of the following detailed description, wherein similar or identical structures have similar or identical reference numerals.

DETAILED DESCRIPTION

Figure 1:
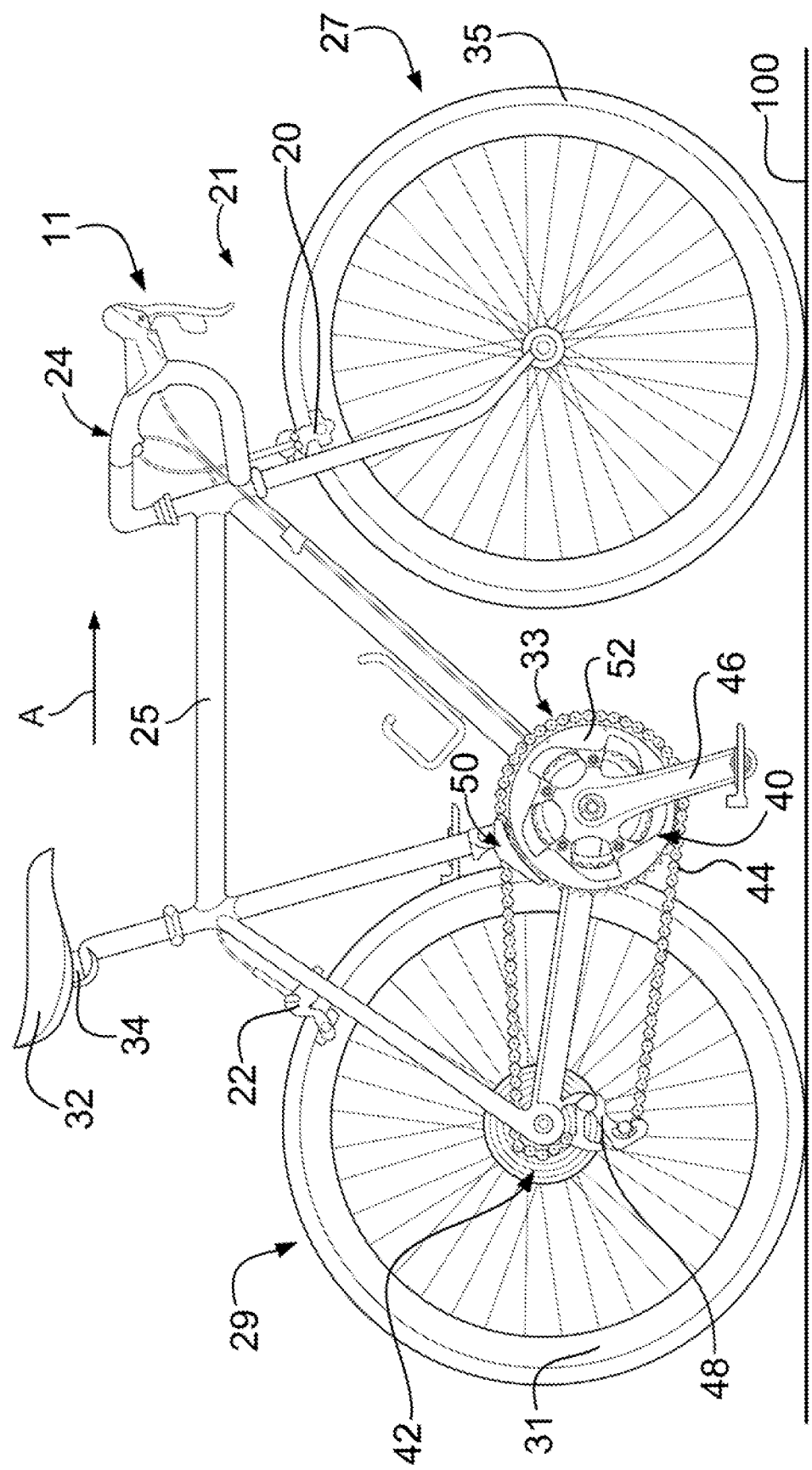
FIG. 1 is a side view of a road type bicycle used to employ a drive arrangement.

FIG. 1 is a side view of a road-type configuration of a bicycle 21 used to employ a drive arrangement 33. The bicycle 21 includes a frame 25, front and rear wheels 27, 29 rotatably attached to the frame 25, and the drive arrangement 33. A front brake 20 is provided for braking the front wheel 27 and a rear brake 22 is provided for braking the rear wheel 29. Each of the front and rear wheels 27, 29 includes a tire 35 attached to a rim 31, where the tire 35 is configured to engage the riding surface 100. A handlebar assembly 24 is provided for steering the front wheel 27. The direction of arrow "A" indicates a front and/or forward orientation of the bicycle 21. As such, a forward direction of movement for the bicycle 21 corresponds to the direction A.

Figure 2:
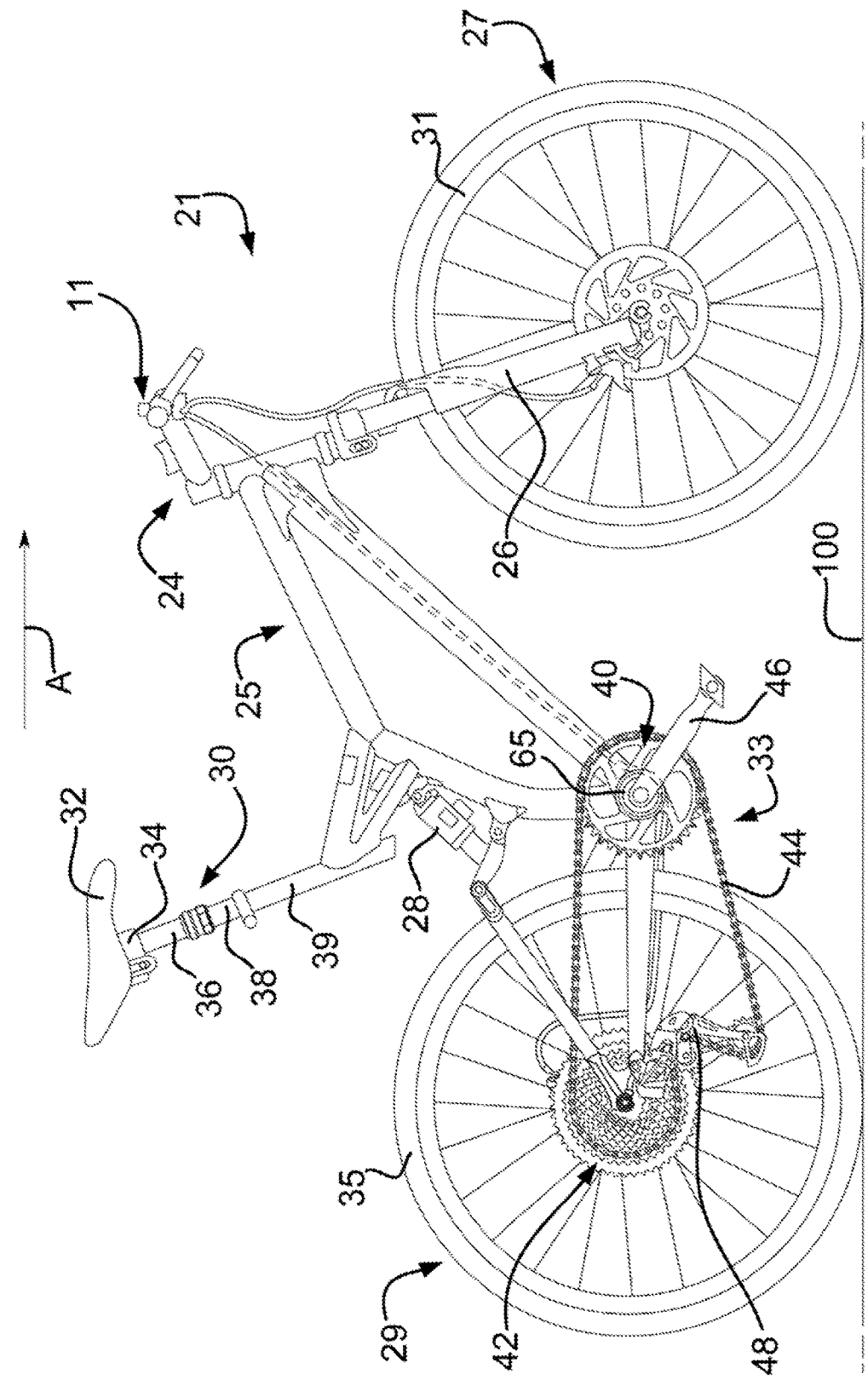
FIG. 2 is a side view of an off-road type bicycle used to employ a drive arrangement.

Other configurations of the bicycle 21 are contemplated. For instance, FIG. 2 depicts the bicycle 21 having a mountain-type or off-road configuration. Potential differences between bicycles of various configurations include those depicted between FIG. 1 and FIG. 2. For example, FIG. 1 depicts the handlebar assembly 24 in a drop-type configuration, whereas the example in FIG. 2 has a flat-type configuration of the handlebar assembly 24. The example in FIG. 2 also includes a front suspension 26 for movably mounting the front wheel 27 to the frame 25 and a rear suspension 28 for movably mounting the rear wheel 29 to the frame 25. The front and rear suspensions 26, 28 may include one or more of an adjustable suspension component such as a spring or damper. An adjustable seating component 30 is also shown in this example configured to movably attach a saddle 32 to the frame 25. The adjustable seating component 30 may include a seat post head 34 attachable to the saddle 32 and connected to a seat post upper 36. The seat post upper 36, the seat post head 34, and the saddle 32 may be configured to move relative to a seat post lower 38 fixably attached to the frame 25. For instance, the seat post upper 36 may ride within the seat post lower 38, where the seat post lower 38 is fixed to a seat tube 39 of the frame 25.

FIGS. 1 and 2 each depict an embodiment of the drive arrangement 33 including a drive sprocket assembly 40 rotatably mounted to the frame 25, a driven sprocket assembly 42 mounted to the rear wheel 29, and a chain 44 engaging the drive sprocket assembly 40 and the driven sprocket assembly 42, which may be a rear sprocket assembly. The drive sprocket assembly 40 may be attached to a crank 46 to facilitate torque transfer from a rider to the rear wheel 29 through the drive sprocket assembly 40, to the chain 44, and to the driven sprocket assembly 42. For example, the drive sprocket assembly 40 may connect to a left and right pair of crank arms of the crank 46 through a crank mounting portion 65.

Figure 19:
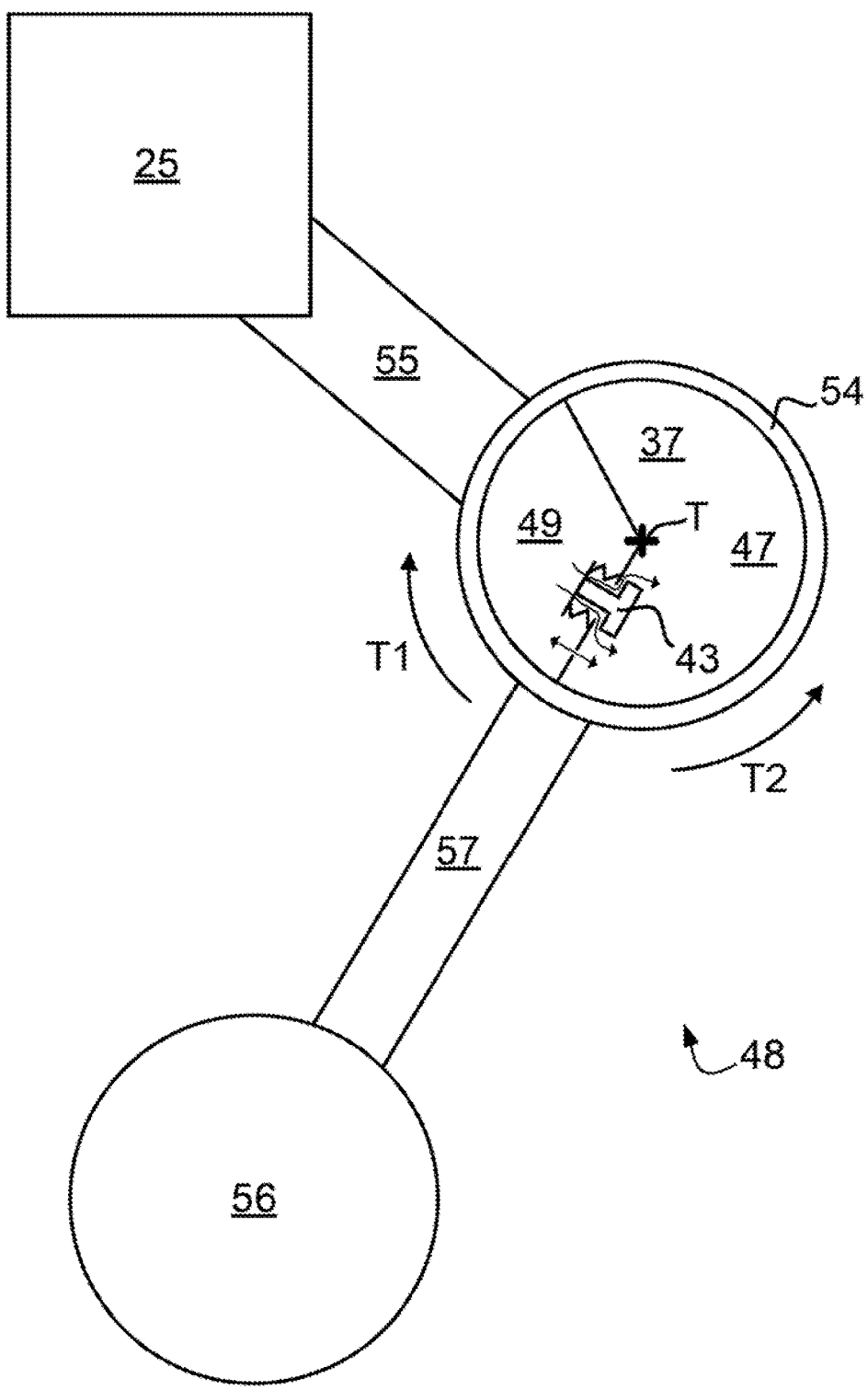
FIG. 19 is a sectional schematic view of a gear changer of a drive arrangement.

The chain 44 may be shifted through a plurality of driven sprockets of the driven sprocket assembly 42 with a rear gear changer 48 as depicted in FIG. 19. The plurality of driven sprockets of the driven sprocket assembly 42 may be arranged by radius, for example each further outboard sprocket having a smaller radius than the last. The chain 44 may also be shifted through a plurality of drive sprockets of the drive sprocket assembly 40 with a front gear changer 50. The plurality of drive sprockets of the drive sprocket assembly 40 may be arranged by radius, for example each further outboard drive sprocket having a larger radius than the last. Alternatively, as in FIG. 4, the front gear changer 50 may be omitted as when the drive sprocket assembly 40 consists of one of a solitary drive sprocket 52.

Each of FIGS. 1 and 2 depict an embodiment of a control assembly 23 for controlling components of the bicycle. For example, the control assembly 23 may be configured to control shifting of the drive arrangement 33. The control assembly 23 may be a plurality of control assemblies. For example, a pair of control assemblies 23 may be used. Other embodiments of the control assembly 23 are contemplated, for instance in a triathlon or time trial application where a first pair of control assemblies 23 may be used on extensions of the handlebar assembly 24 and a second pair of control assemblies may be used adjacent brake levers.

Figure 3:
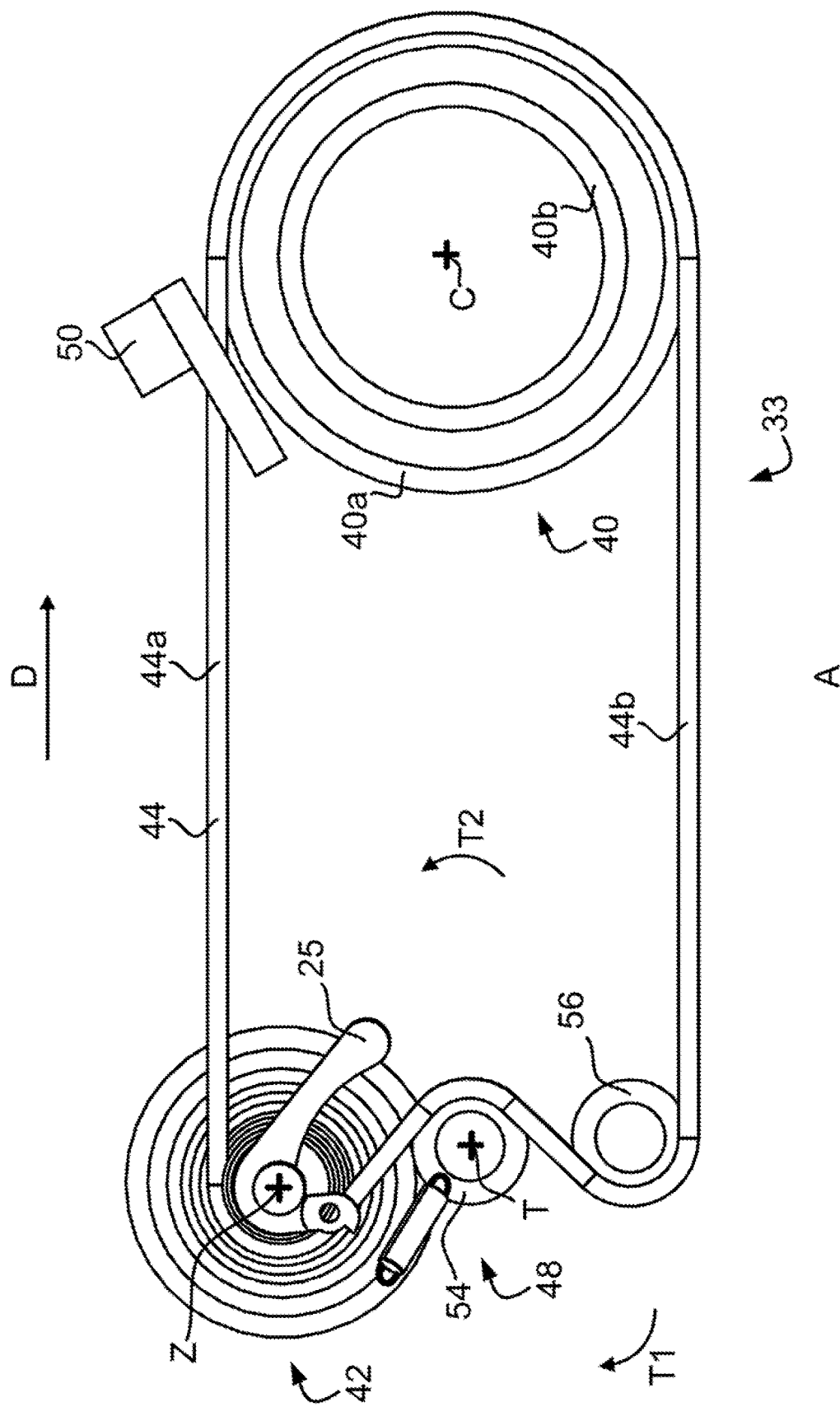
FIG. 3 is a side schematic view of a drive arrangement having multiple drive sprockets.

FIG. 3 is a side schematic view of an embodiment of the drive arrangement 33 having multiple drive sprockets on the drive sprocket assembly 40. In an embodiment, the drive sprocket assembly 40 has a first drive sprocket 40a and a second drive sprocket 40b. The front gear changer 50 may be used to shift the chain 44 between the first and second drive sprockets 40a, 40b. The front gear changer 50 may be configured to displace an upper chain segment 44a of the chain 44, defined between the drive sprocket assembly 40 and the driven sprocket assembly 42, axially from one of the first and second drive sprockets 40a, 40b to the other. The front gear changer 50 may also be configured to axially displace the chain 44 on the drive sprocket assembly 40, as with movable shift features disposed on the drive sprocket assembly 40.

The drive sprocket assembly 40 may rotate about a crank axis C. For example, the crank 46 may be used to rotate the drive sprocket assembly 40 about the crank axis C to drive the driven sprocket assembly 42 with the upper chain segment 44a. The driven sprocket assembly 42 may rotate about a rear wheel axis Z. For example, the driven sprocket assembly 42 may be configured to rotationally drive the rear wheel 29 following a drive direction D of the upper chain segment 44a. In an embodiment, the driven sprocket assembly 42 is configured to rotate freely from the rear wheel 29 in a direction opposite the drive direction D of the upper chain segment 44a.

The driven sprocket assembly 42 may be mountable to the frame 25 about the rear wheel axis Z. For example, fixing means such as quick release skewers, bolt-on axles, and/or thru-axle skewers may be used to mount the driven sprocket assembly 42. The driven sprocket assembly 42 may be mountable with the rear wheel 29. For example, the driven sprocket assembly 42 may be mountable to the rear wheel 29 and the rear wheel 29 then mountable to the frame 25 about the rear wheel axis Z about which both the rear wheel 29 and the driven sprocket assembly 42 are rotatable relative to the frame 25. Alternatively, the driven sprocket assembly 42 may be mountable to the frame 25 independently from the rear wheel 29. For example, at least one of the driven sprocket assembly 42 and the rear wheel 29 may be independently removable from the frame 25.

Figure 4:
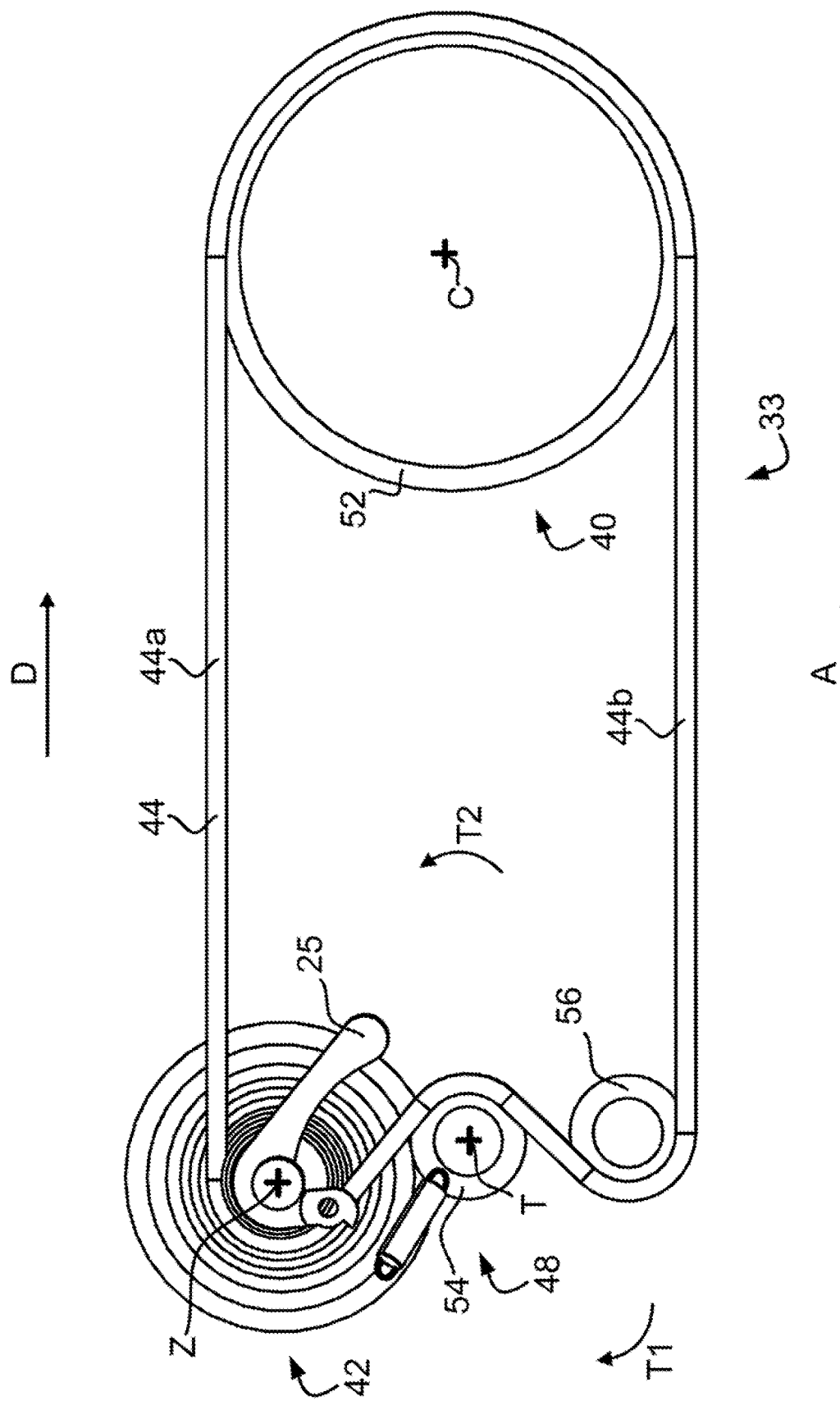
FIG. 4 is a side schematic view of a drive arrangement having a singular drive sprocket.
Figure 6:
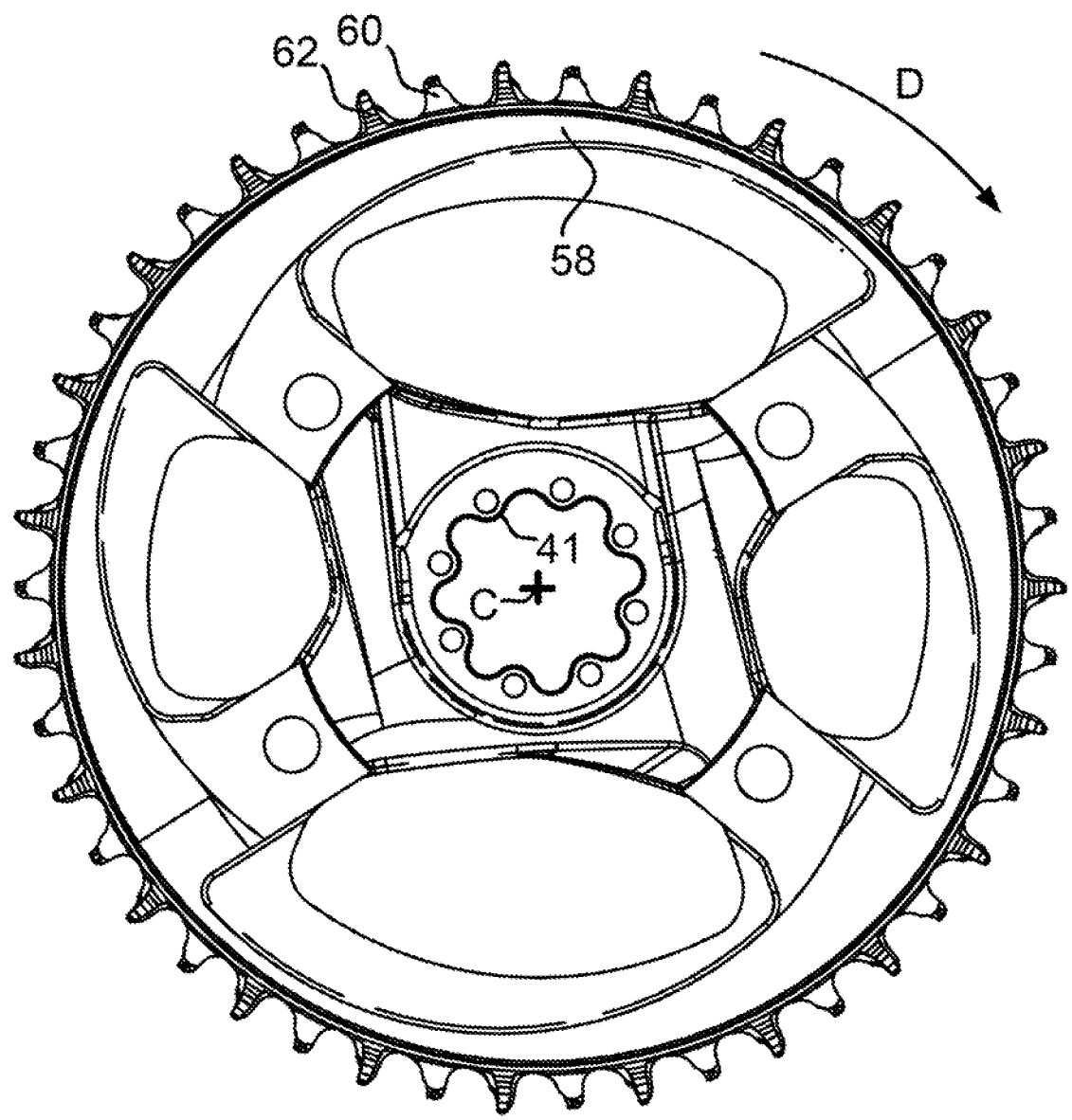
FIG. 6 is an outboard side view of a drive sprocket of a drive arrangement.
Figure 7:
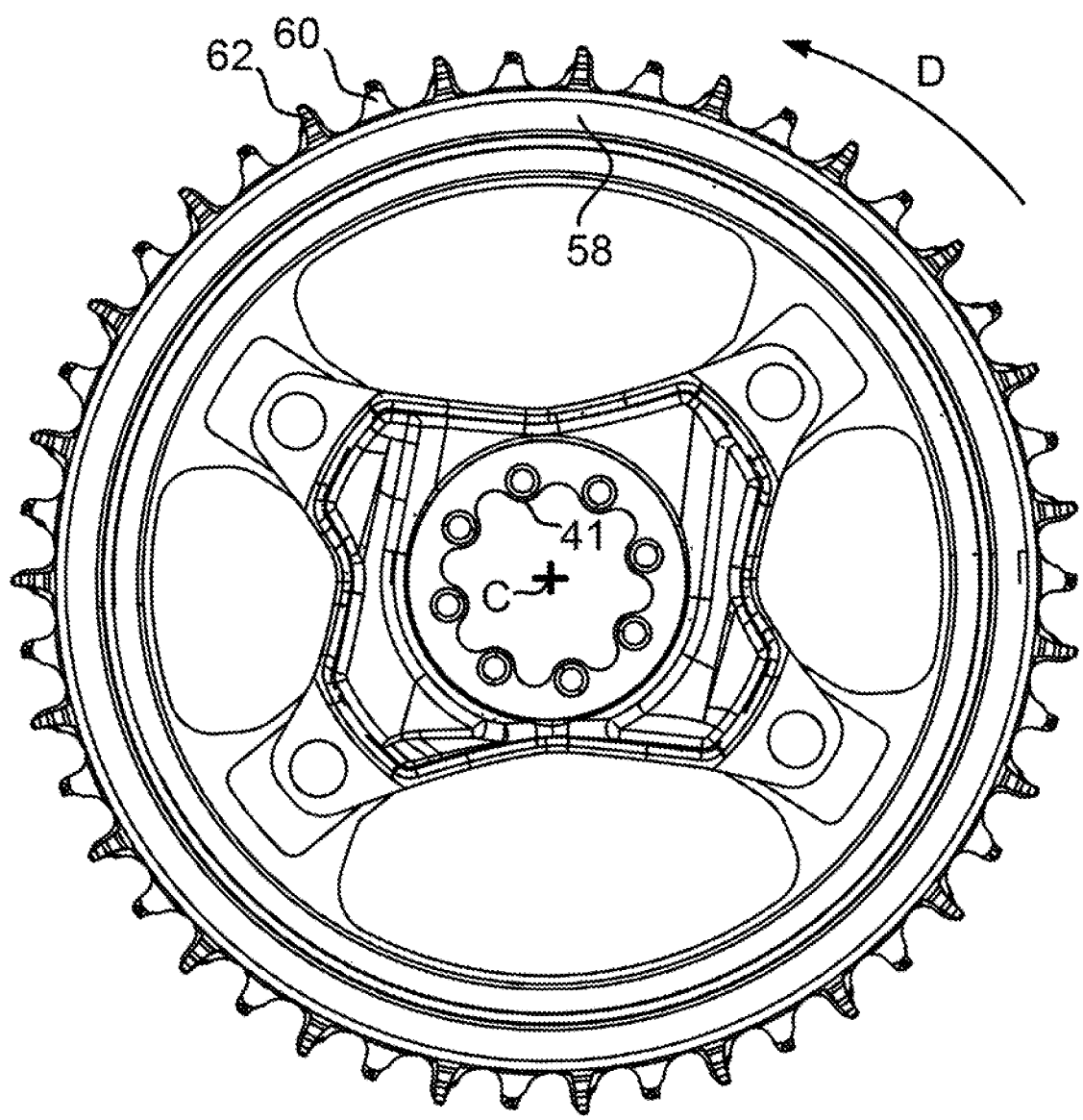
FIG. 7 is an inboard side view of the drive sprocket of FIG. 6.
Figure 8:
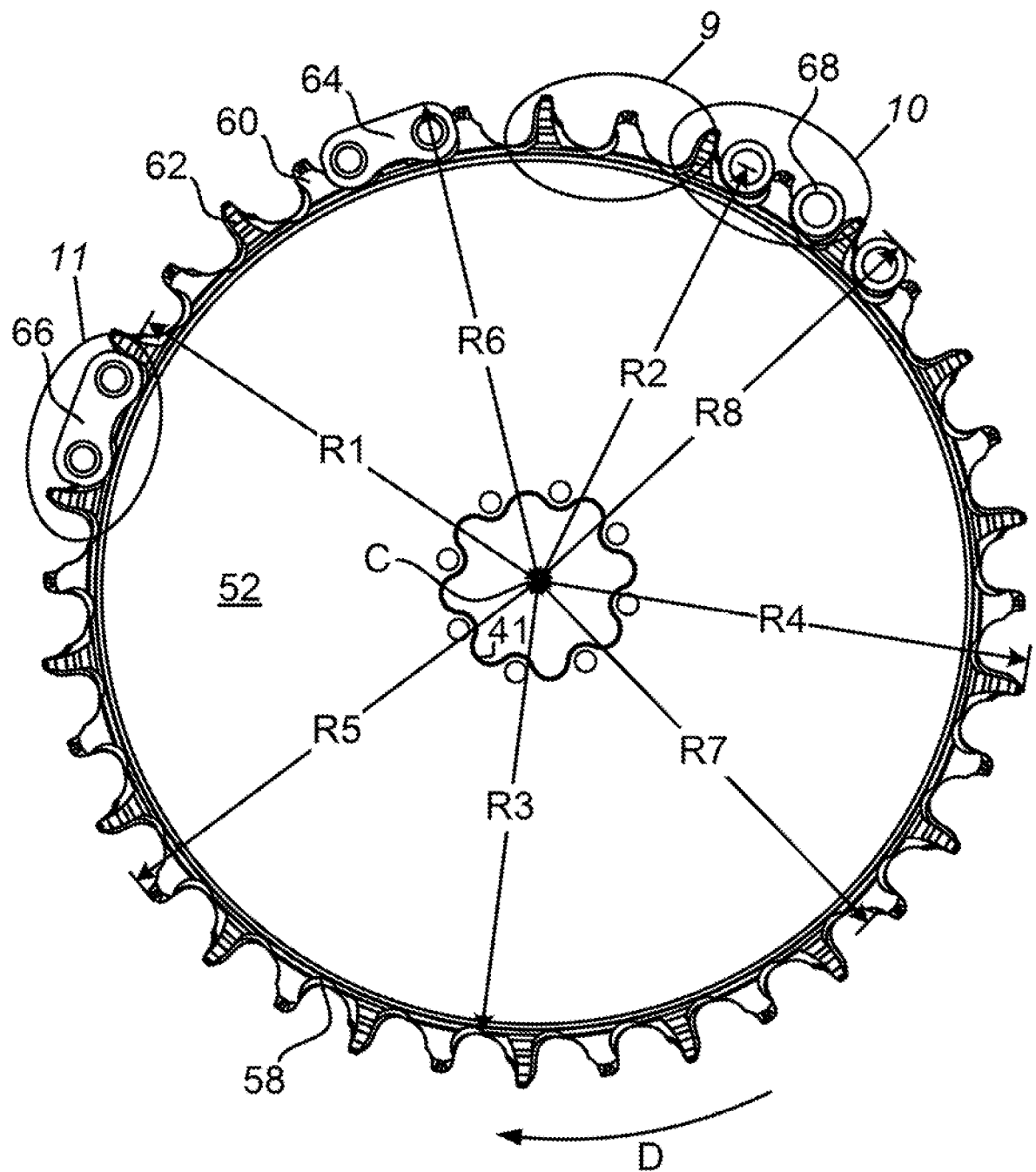
FIG. 8 is an outboard side view of a drive sprocket depicting engagement of chain components.

FIG. 4 is a side schematic view of an embodiment of the drive arrangement 33 having a solitary drive sprocket 52. The drive sprocket assembly 40 may be configured specifically for the solitary drive sprocket 52. For example, the drive sprocket assembly 40 may have a sprocket mounting portion 41 as shown in FIGS. 6-8 configured to align the solitary drive sprocket 52 with other components of the drive arrangement 33 by connecting to the crank mounting portion 65.

The rear gear changer 48 may include one or more chain tensioning features. For example, the rear gear changer 48 may include a tension pulley 56 configured to apply tension to the drive arrangement 33. For example, the tension pulley 56 may tension a lower chain segment 44b of the chain 44, defined between the drive sprocket assembly 40 and the driven sprocket assembly 42. Tension applied to the lower chain segment 44b may aid in retention of the chain 44. The tension pulley 56 may be rotatable about a tensioning axis T. For example, the tension pulley 56 may rotate in a tensioning direction T1 to apply tension to the drive arrangement 33 and may rotate in a detensioning direction T2 to release tension in the drive arrangement 33. The rear gear changer 48 may control movement in one or both of the tensioning direction T1 and the detensioning direction T2 as shown and described with reference to FIG. 19.

The rear gear changer 48 may include a guide pulley 54. The guide pulley 54 may be used to position the chain 44 relative to the driven sprocket assembly 42. For example, the guide pulley 54 may be movable axially relative to the rear wheel axis X to shift the chain 44 between driven sprockets of the driven sprocket assembly 42. The guide pulley 54 may also control the radial displacement from the rear wheel axis Z of a portion of the chain 44 relative to the driven sprocket assembly 42. For example, the rear gear changer 48 and the driven sprocket assembly 42 may be geometrically controlled so that the guide pulley 54 maintains a consistent radial distance from an engaged one of the driven sprockets of the driven sprocket assembly 42 relative to the rear wheel axis Z. In an embodiment, the guide pulley 52 is rotatable about the tensioning axis T.

FIG. 5A is a top schematic view of the embodiment of the drive arrangement 33 of FIG. 4 in a driving state. The driving state may be characterized by meshing of a single one of the driven sprockets of the driven sprocket assembly 42 and the solitary drive sprocket 52. For example, a rider may power the rear wheel 29 through the drive arrangement 33 without interruption in the driving state.

The embodiment shown in FIG. 5A depicts the drive arrangement 33 having twelve (12) driven sprockets on the driven sprocket assembly 42. More or fewer driven sprockets may be included. Spacing between driven sprockets of the driven sprocket assembly 42 along the rear wheel axis Z may be uniform. Alternatively, this axial spacing may be changing. For example, driven sprockets of the driven sprocket assembly 42 with relatively small changes in diameter to the next driven sprocket may have a relatively large change in axial spacing to the next driven sprocket. Driven sprockets of the driven sprocket assembly 42 with relatively large changes in diameter to the next driven sprocket may have a relatively small change in axial spacing to the next drive sprocket.

The driven sprockets of the driven sprocket assembly 42 may have consistent changes in diameter between adjacent sprockets. Alternatively, the driven sprocket assembly 42 may grow progressively in diameter along the rear wheel axis Z. For example, a percentage change in diameter of each of the driven sprockets of the driven sprocket assembly 42 may increase moving axially inboard from the frame 25 to the rear wheel 29 along the rear wheel axis Z.

The embodiment in FIG. 5A depicts a straight chainline of the chain 44. A straight chainline may be characterized by none or very little lateral bending of the chain 44 between the drive sprocket assembly 40 and the driven sprocket assembly 42. A straight chainline may only be achieved at one combination of driven sprocket and drive sprocket in an embodiment having the solitary drive sprocket 52. In the embodiment, shown, the chain 44 is in a straight chainline orientation when aligned with the fourth sprocket inboard from the frame 25. In an embodiment, the solitary drive sprocket 52 may be aligned with the driven sprocket assembly 42 in a plane in line with or adjacent to a relatively outboard driven sprocket.

FIG. 5B is a top schematic view of the drive arrangement 33 of FIG. 4 in a shifting state. The chain 44 is shown being shifted between the fourth outboardmost driven sprocket to the sixth outboardmost driven sprocket of the driven sprocket assembly 42. The chain 44 may be shifted by the guide pulley 54 of the rear gear changer 48. Shifts may be performed between adjacent driven sprockets of the driven sprocket assembly 42 or between more distant driven sprockets.

An amount of chain skew of the chain 44 is shown in FIG. 5B, beginning with the lower chain segment 44a. As the drive arrangement 33 continues to rotate in the drive direction D the driven sprocket assembly 42 may shift the upper chain segment 44b to the same amount of chain skew as the lower chain segment 44a. The driven sprocket assembly 44a may be configured with shift features such as ramps, channels, and/or pins to facilitate this shifting operation.

FIG. 6 is an outboard side view of a solitary drive sprocket 52 of an embodiment of the drive arrangement 33. The solitary drive sprocket 52 may include various portions. For example, the solitary drive sprocket 52 may include the sprocket mounting portion 41 for mounting to the crank mounting portion 65 of the crank 46. The solitary drive sprocket 52 may also include a chain engaging portion 58. The chain engaging portion 58 may be provided with a plurality of teeth for engaging the chain 44.

The chain engaging portion 58 may include a thin tooth 60. The thin tooth 60 may be configured for engaging a relatively small space between link plates of the chain 44. For example, the thin tooth 60 may be configured to fit within each and every link plate space of the chain 44. The chain engaging portion 58 may include a plurality of the thin tooth 60. For example, a plurality of thin teeth 60 may be provided alternatingly around a circumference of the chain engaging portion 58 about the crank axis C.

The chain engaging portion 58 may include a thick tooth 62. The thick tooth 62 may be configured for engaging a relatively large space between link plates of the chain 44. For example, the thick tooth 60 may be configured to within only relatively large link plate spaces of the chain 44. The chain engaging portion 58 may include a plurality of the thick tooth 62. For example, a plurality of thick teeth 62 may be provided alternatingly between the plurality of thin teeth 60 around the circumference of the chain engaging portion 58 about the crank axis C.

FIG. 7 is an inboard side view of the solitary drive sprocket 52 of FIG. 6. The chain engaging portion 58 may be unitary with the sprocket mounting portion 41 or the two may be separable components as shown in the embodiment of FIG. 7.

FIG. 8 is an outboard side view of an embodiment of a solitary drive sprocket 52 depicting engagement of chain components. An outer link assembly 64 is shown engaged with the plurality of thick teeth 62. Each of the plurality of thick teeth 62 may be specifically configured for engagement with the outer link assembly 64. For example, the thick tooth 62 may be sized and shaped to engage only with the outer link assembly 64 and not with an inner link assembly 66.

The inner link assembly 66 is shown engaged with the plurality of thin teeth 60. The inner link assembly 66 may be specifically configured for engagement with the plurality of thin teeth. For example, the plurality of thick teeth 62 may be too large to fit within a gap of the inner link assembly 66. In an embodiment, the plurality of thick teeth 62 have an outer axial dimension relative to the crank axis C that is greater than a corresponding inner axial dimension of the inner link assembly 66.

The embodiment of FIG. 8 depicts a unitary configuration of the sprocket mounting portion 41 and the chain engaging portion 58. This one-piece configuration may facilitate mounting of the solitary drive sprocket 52 directly to the crank 46. In such a configuration, complexity may be minimized. This configuration may also increase clearance between the drive sprocket assembly 40 and the frame 25 as fixing means need not protrude towards the frame 25.

FIG. 8 depicts a first radial height R1 of radially outermost extent of a thick tooth load feature 74 of the thick tooth 62 relative to the crank axis C. Each of the second through eighth radial heights R2-R8 will also be described relative to the crank axis C. This outermost point may be referred to as a thick tooth load feature radially outermost extent 77.

A second radial height R2 is that of a roller axis AA of a roller 68 of the chain 44.

A third radial height R3 is that of a root circle of the solitary drive sprocket 52.

A fourth radial height R4 is that of a radially outermost extent of a thick tooth guiding tip 72 of the thick tooth 62. This outermost point may be referred to as a thick tooth guiding tip radially outermost extent 80.

A fifth radial height R5 is that of a radially outermost extent of a thin tooth guiding tip 70 of the thin tooth 60. This outermost point may be referred to as a thin tooth guiding tip radially outermost extent 78.

A sixth radial height R6 is that of a radially outermost point of the outer link assembly 64. The radially outermost point of the outer link assembly 64 may be disposed directly above the roller axis AA along a radial line extending from the crank axis through the roller axis AA. In an embodiment, the radially outermost point of the outer link assembly 64 is equal to a radial height of a radially outermost point of the inner link assembly 66.

A seventh radial height R7 is of a radially outermost extent of a thin tooth load feature 74 of the thin tooth 60. This outermost point may be referred to as a thin tooth load feature radially outermost extent 75.

An eighth radial height R8 is of a radially outermost extent of the roller 68 of the chain 44. This outermost point is along a radial line extending from the crank axis C and through the roller axis AA.

Figure 9:
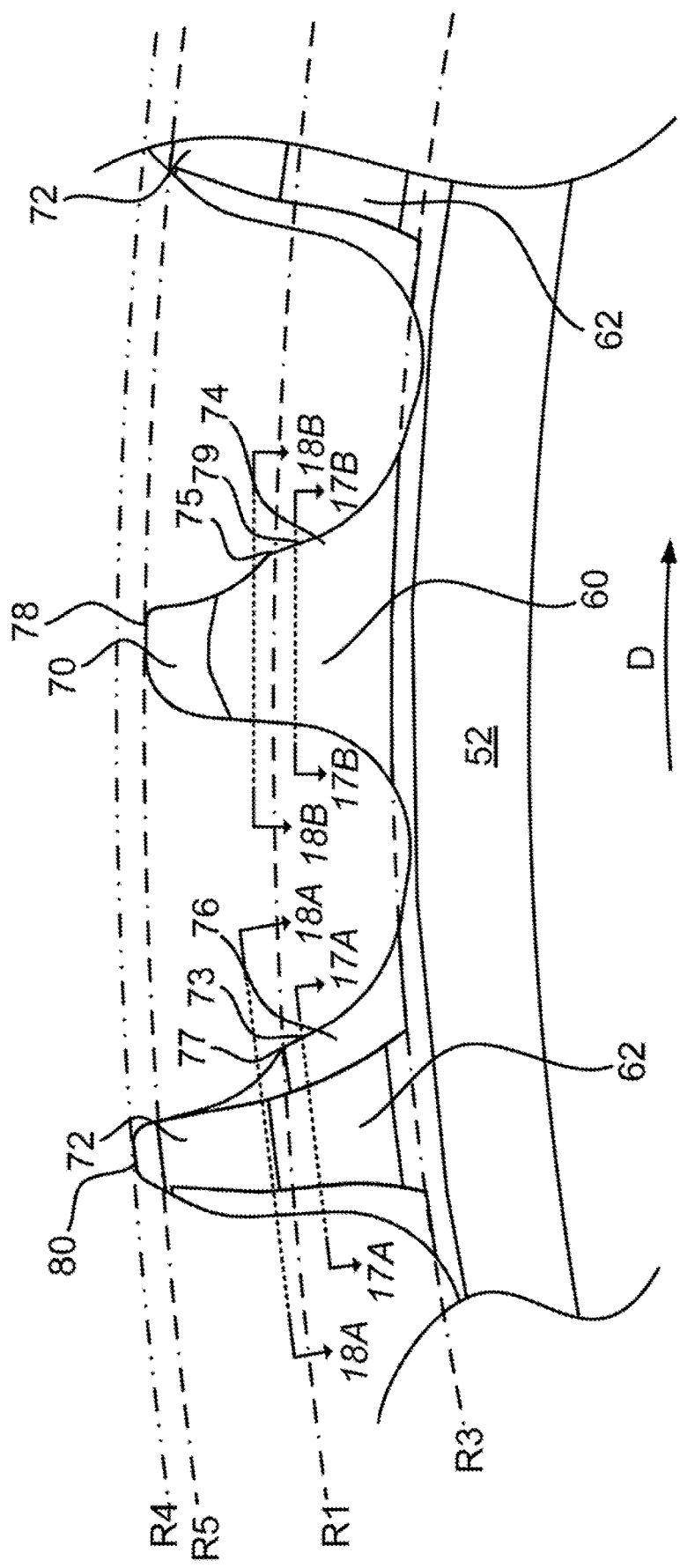
FIG. 9 is an enlarged view of the drive sprocket of FIG. 8.

FIG. 9 is an enlarged view of the solitary drive sprocket 52 of FIG. 8. The thick tooth 62 may be configured with various features. For example, the thick tooth 62 may include the thick tooth load feature 76. The thick tooth load feature 76 may be configured to interact with a roller surface 69 of the roller 68. For example, the thick tooth load feature 76 may be contoured to accept the roller surface 69. In an embodiment, the thick tooth load feature 76 is configured to contact the roller surface 69 at a thick tooth contact point 73. The thick tooth contact point 73 may be part of a contact area. For example, the thick tooth contact point 73 may be disposed on a radius matching that of the roller surface 69. The contact area may also represent an expanded zone during driving load when one or both of the thick tooth load feature 76 and the roller surface 69 deform.

The thick tooth 62 may include the thick tooth guiding tip 72. The thick tooth guiding tip 72 may be disposed radially outward of the thick tooth load feature 76 relative to the crank axis C. For example, the thick tooth guiding tip 72 may begin directly radially above the thick tooth load feature radially outermost extent 77.

The thick tooth guiding tip 72 may be configured for guiding the chain 44 into engagement. For example, the thick tooth guiding tip 72 may be tapered to accept one of the outer link assemblies 64 of the chain 44. In an embodiment, the thick tooth guiding tip 72 has a thick tooth guiding tip radially outermost extent 80 disposed relatively far from the crank axis C for guiding the chain 44 at a relatively early point during rotation in the drive direction D.

The thin tooth 60 may be configured with various features. For example, the thin tooth 60 may include the thin tooth load feature 74. The thin tooth load feature 74 may be configured to interact with a roller surface 69 of the roller 68. For example, the thin tooth load feature 74 may be contoured to accept the roller surface 69. In an embodiment, the thin tooth load feature 74 is configured to contact the roller surface 69 at a thin tooth contact point 79. The thin tooth contact point 79 may be part of a contact area. For example, the thin tooth contact point 79 may be disposed on a radius matching that of the roller surface 69. The contact area may also represent an expanded zone during driving load when one or both of the thin tooth load feature 74 and the roller surface 69 deform.

The thin tooth 60 may include the thin tooth guiding tip 70. The thin tooth guiding tip 70 may be disposed radially outward of the thin tooth load feature 74 relative to the crank axis C. For example, the thin tooth guiding tip 70 may begin directly radially above the thin tooth load feature radially outermost extent 75.

The thin tooth guiding tip 70 may be configured for guiding the chain 44 into engagement. For example, the thin tooth guiding tip 72 may be tapered to accept one of the inner link assemblies 66 of the chain 44. In an embodiment, the thick tooth guiding tip 72 has a thick tooth guiding tip radially outermost extent 80 disposed radially further than the thin tooth guiding tip 70 from the crank axis C. This may be shown by the relatively large fourth radial height R4 compared to relatively small radial height R5.

The first radial height R1 of the thick tooth load feature radially outermost extent 77 may be expressed proportionally relative to the fourth and fifth radial heights R4, R5. For example, a quotient of the first radial height R1 over the fifth radial height R5 may be greater than a quotient of the first radial height R1 over the fourth radial height R4. In an embodiment, the first radial height R1 may be closer to the fifth radial height R5 than to the third radial height R3 of the root circle. The first radial height R1 may also be closer to the third radial height R3 than to the fourth radial height R4.

Figure 10:
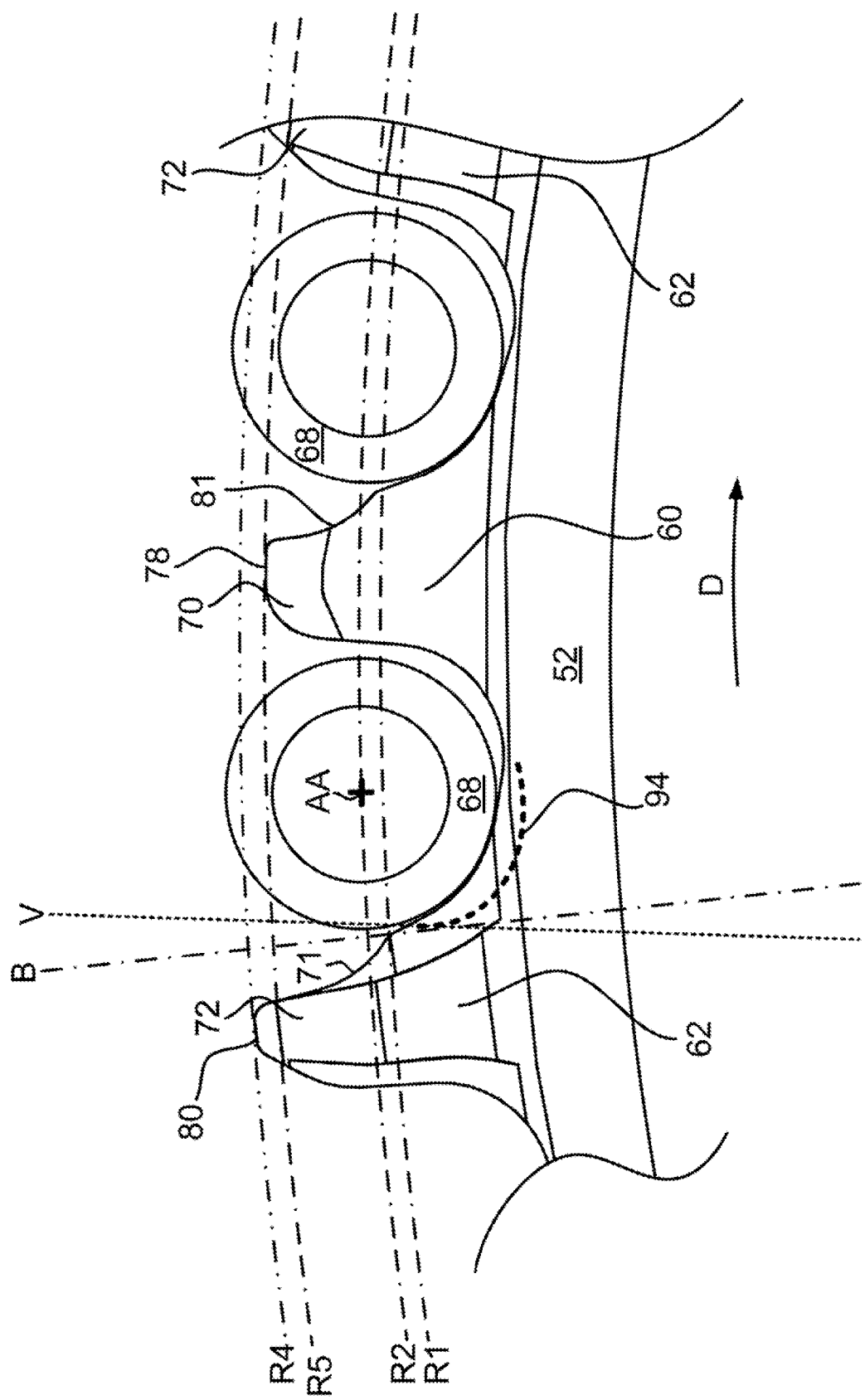
FIG. 10 is an enlarged view of the drive sprocket of FIG. 8.

FIG. 10 is an enlarged view of the solitary drive sprocket 52 of FIG. 8. The view of FIG. 10 shows the roller axis AA of the roller 68 during a state of drivetrain engagement. Although other components of the chain 44 are not shown in this depiction, the each of the rollers 68 are positioned as if the chain 44 were assembled and was being driven by a torque through the solitary drive sprocket 52.

The roller axis radial height, represented as the second radial height R2, is depicted relative to the crank axis C. The second radial height R2 may be greater than the first radial height R1 of the thick tooth load feature radially outermost extent 77. In an embodiment, the thick tooth contact point 73 is radially below the first radial height R1 which is in turn radially below the second radial height R2.

Figure 11:
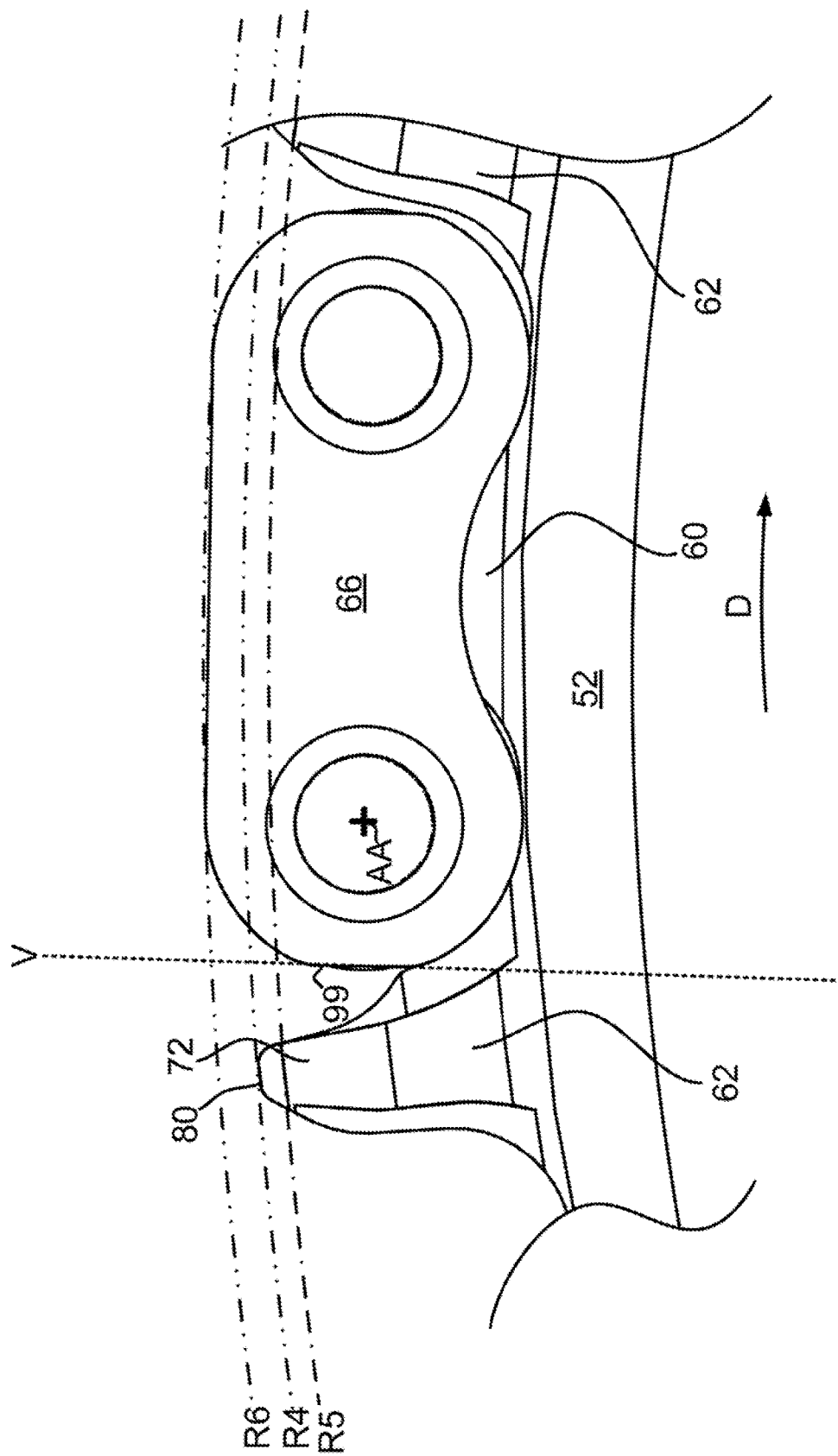
FIG. 11 is an enlarged view of the drive sprocket of FIG. 8.

The pair of the rollers 68 depicted in FIG. 10 may be part of the inner link assembly 66 as depicted in FIG. 11. The inner link assembly 66 may include one or more features configured to interact with the thick tooth 62. For example, the inner link assembly 66 may include a load chamfer 94 configured to guide the thick tooth 62. In an embodiment, the load chamfer 94 is configured to guide the thick tooth load feature 76 into driving engagement with the roller surface 69. The load chamfer 94 may be sized and shaped to extend beyond the roller surface 69 of the roller 68 relative to the roller axis AA. The load chamfer 94 may extend past the thick tooth load feature 76 of the thick tooth 62 in a radial direction from the roller axis AA during drivetrain engagement.

A recess area as seen from the side view may be defined between components of the drive arrangement 33. For example, the recess area may be bounded by: a load line B extending in a radial direction from the crank axis C through the thick tooth load feature radially outermost extent 77; a circumference defined by the fourth radial height R4 of the thick tooth guiding tip radially outermost extent 80; and a thick tooth guiding tip outer profile 71 of the thick tooth guiding tip 72 between the thick tooth load feature radially outermost extent 77 and the thick tooth guiding tip radially outermost extent 80.

The recess area of the thick tooth 62 may represent a release area for the rollers 68 of the chain 44. For example, the roller 68 may depart from the thick tooth load feature 76 into the recess area during transitional rotation of the chain 44 from the solitary drive sprocket 52 to the lower chain segment 44b. The recess area may be tunable. For example, the recess area may be made relatively large to allow a roller 68 to smoothly depart from a worn thick tooth load feature 76 which may otherwise reduce or eliminate a smaller embodiment of the recess area.

A similar recess area may be defined with reference to the thin tooth 60. For example, the thin tooth guiding tip radially outermost extent 77, the thin tooth load feature radially outermost extent 75, and a thin tooth guiding tip outer profile 81 of the thin tooth guiding tip 70 may be used to determine the bounds of a thin tooth recess area.

FIG. 11 is an enlarged view of the solitary drive sprocket 52 of FIG. 8. The view of FIG. 11 depicts the inner link assembly 66 engaged with the thin tooth 60. The inner link assembly 66 may be configured to cover the thin tooth guiding tip radially outermost extent 77. The outer link assembly 64 may also be configured to cover the thick tooth guiding tip radially outermost extent 80. The sixth radial height R6 of the outer link assembly 64 may be greater than the fifth radial height of the thin tooth 60 and/or the fourth radial height of the thick tooth 62. In an embodiment, the sixth radial height R6 is also the radial height of an outermost extent of the outer link assembly 64.

FIG. 11 depicts a tangent line V along a clearance feature 99 of the inner link assembly 66. The tangent line V may be defined as a line through an uppermost point of the clearance feature 99 and a lowermost point of the clearance feature 99. In an embodiment, the tangent line is defined between a clearance feature lower extent E1 and a clearance feature upper extent E2.

The clearance feature 99 may be configured to provide clearance for the roller 68 to interact with other components of the drive arrangement 33. For example, the clearance feature 99 may be sized and shaped to allow the corresponding one of the plurality of the rollers 68 to align with or protrude past the clearance feature 99 in a third radial direction L of the load chamfer 94 relative to the roller axis AA during drivetrain engagement.

The clearance feature 99 may be used to define a clearance area. The clearance area may be greater than recess area. For example, the clearance area may be defined with similar bound to the recess area, but replacing the load line B with the tangent line V. The clearance feature 99 may provide a greater amount of clearance for the roller 68 to disengage from the drive sprocket assembly 40. In an embodiment, the clearance feature 99 is sized and shaped to not interfere with the thick tooth 62 during at least one of drivetrain engagement and drivetrain disengagement.

Figure 12:
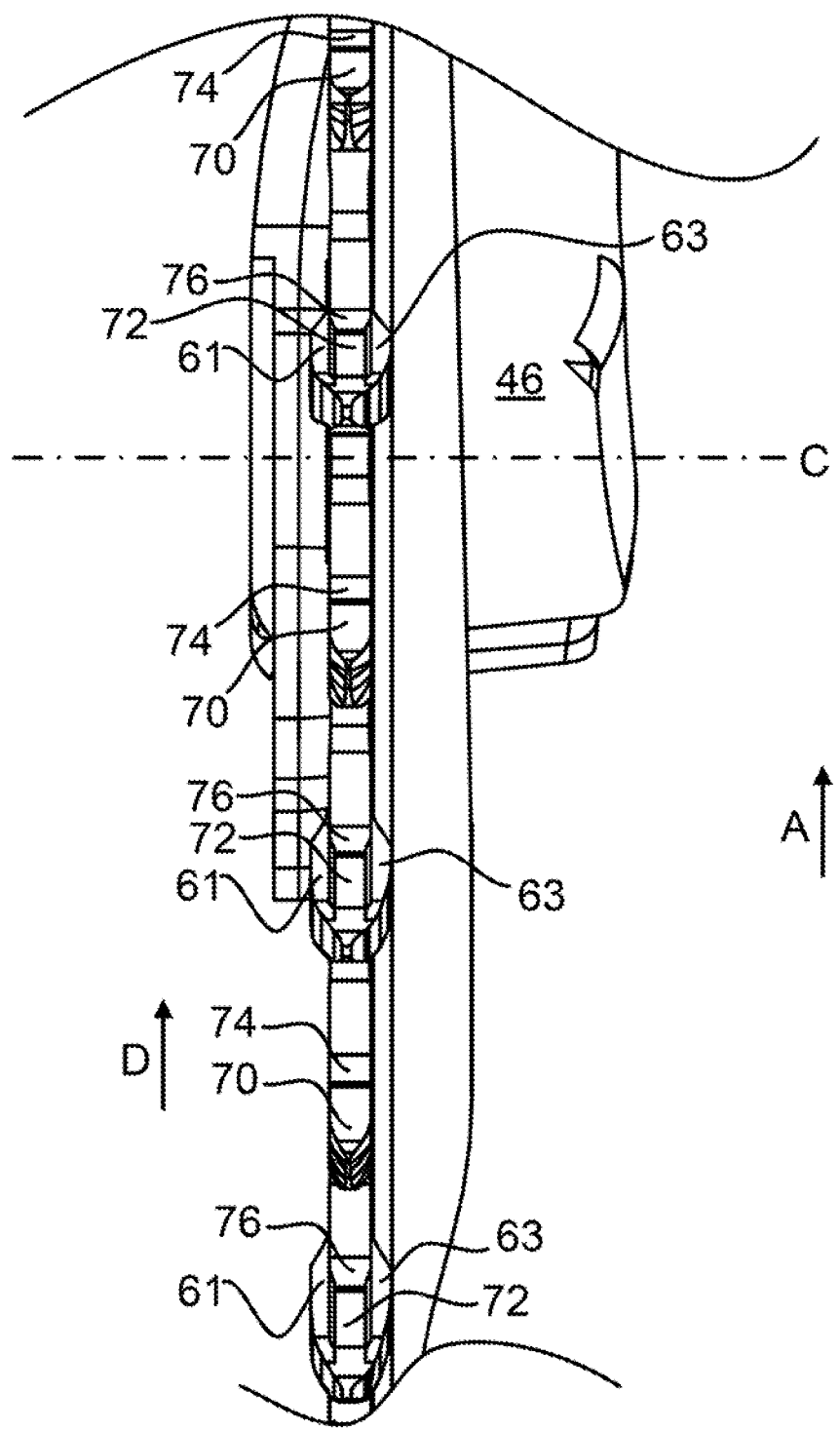
FIG. 12 is a partial top view of a drive sprocket of a drive arrangement.

FIG. 12 is a partial top view of an embodiment of the solitary drive sprocket 52 of the drive arrangement 33. The thick tooth 62 may include one or more width features. For example, the thick tooth 62 may include protruding chain retention features axially relative to the crank axis C. In an embodiment, the thick tooth 62 includes a thick tooth inboard protrusion 61 and a thick tooth outboard protrusion 63. The thick tooth protrusions 61, 63 may have uniform or asymmetric dimensions. For example, the thick tooth outboard protrusion 63 may protrude axially further from the thick tooth 62 than does the thick tooth inboard protrusion 61.

The thick tooth guiding tip 72 may be configured to facilitate chain guiding and/or engagement. For example, the thick tooth guiding tip 73 may have a tapered configuration to guide the chain 44 into engagement during scenarios of chain skew. The thin tooth guiding tip 70 may be similarly configured.

FIG. 13A is an outboard side view of the chain 44 of an embodiment of the drive arrangement. The chain 44 may be of a flat-top configuration. For example, the upper contour of the upper chain segment 44a may be linear across a plurality of the inner and outer link assemblies 66, 64. Such a configuration of the chain 44 may facilitate increased strength. For example, an embodiment of the chain having relatively thin chain plates may employ a flat-top configuration to retain sufficient strength to reliably transmit torque through the drive arrangement 33.

The chain 44 may also include one or more connection and/or disconnection features. For example, the chain 44 may be provided with one or more of a connection link 45. In an embodiment, the connection link 45 provides for tooless connection and disconnection of opposite ends of the chain 44.

The chain 44 may have various planes of asymmetry. For example, the chain 44 may be asymmetric across a longitudinal roller centerline F as shown in FIG. 17 at least with regard to the above-discussed flat-top configuration. The outer link assembly 64 of the chain 44 may also have asymmetry across a centerline halfway between the pair of the rollers 68 of the outer link assembly 64. For example, the outer link assembly 64 may include one or more of an external chamfer 67. The external chamfer 67 may be configured to interact with other components of the drive arrangement 33. For example, the external chamfer 67 may be sized and shaped to cooperate with shift features of the driven sprocket assembly 42 as discussed above.

FIG. 13B is a top view of the chain 44 of FIG. 13A depicting schematic representations of thick teeth 62 and thin teeth 60 of a drive sprocket assembly 40 in engagement with the chain 44. For representation purposes, the teeth 60, 62 of the drive sprocket assembly 40 are laid out as if the drive sprocket assembly 40 had an infinite radius.

Space may be defined between components of the chain. For example, tooth-receiving spaces may be defined between the inner and outer link assemblies 66, 64. The inner link assembly 66 may have a thick tooth receiving space sized and shaped for receiving the thick tooth 62. The inner link assembly 66 may define an inner axial distance G within this space. For example, the inner axial distance G may be defined between an inboard inner link plate 90 and an outboard inner link plate 92 of the inner link assembly 66.

The outer link assembly 64 may have a thin tooth receiving space sized and shaped for receiving the thin tooth 60. The outer link assembly 64 may define an outer axial distance S within this space. For example, the outer axial distance S may be defined between an inboard outer link plate 86 and an outboard outer link plate 88 of the outer link assembly 64.

Figure 14:
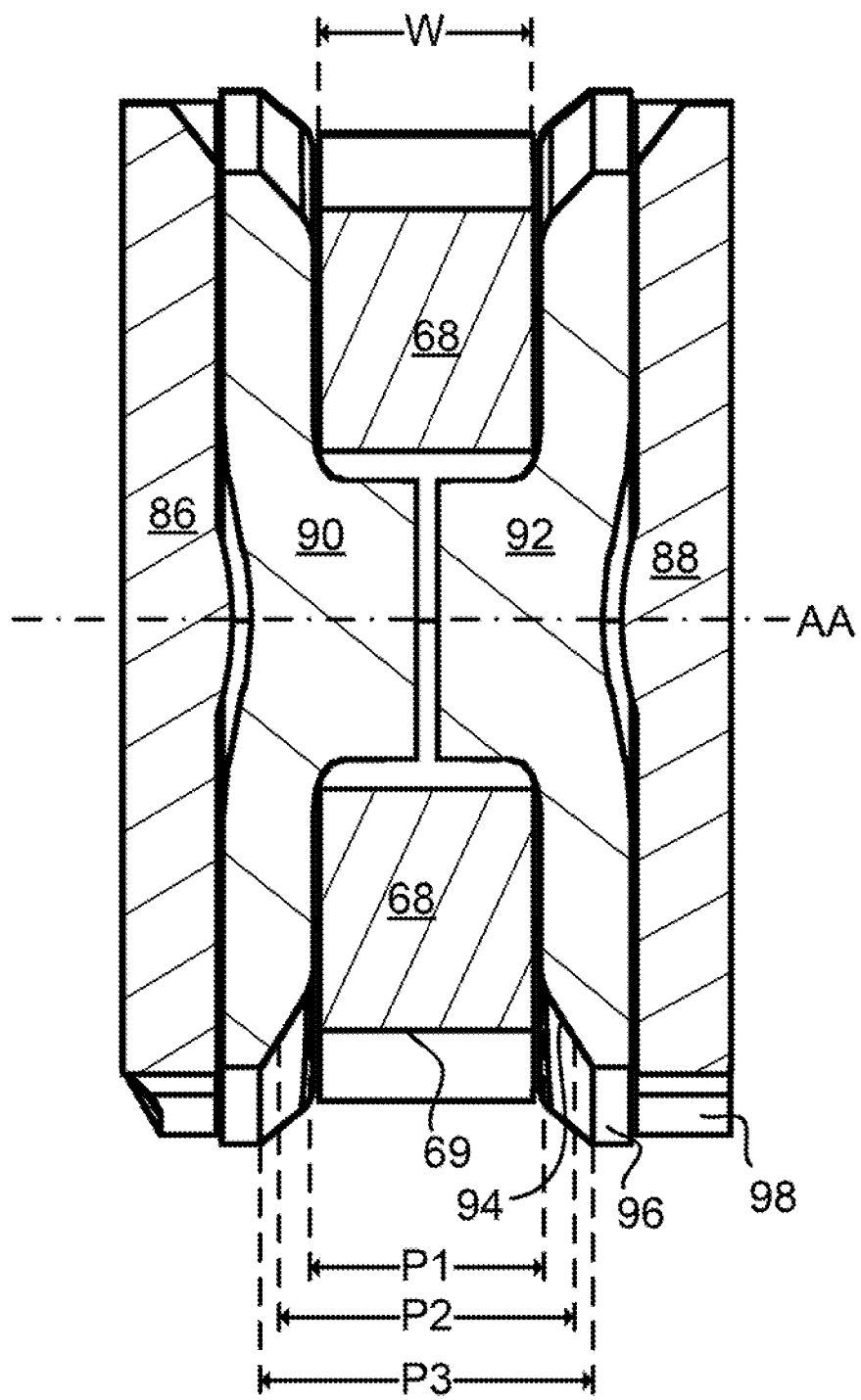
FIG. 14 is a sectional view of the chain of FIG. 13B taken along line 14-14.

FIG. 14 is a sectional view of the chain 44 of FIG. 13B taken along line 14-14. This sectional view depicts the overlap of the load chamfer 94 beyond the roller 86 as in FIG. 10. The load chamfer 94 may be configured as a load feature receiving portion. For example, the load chamfer 94 may be configured to receive a load feature during the engagement process of the chain 44 with the drive sprocket assembly 40. In an embodiment, the load chamfer 94 has an angled surface for receiving the thick tooth load feature 76. In another embodiment, the load chamfer 94 has a convex surface facing the thick tooth load feature 76 as shown in FIG. 17D.

The roller 68 is shown to have a roller width W in FIG. 14. The roller width W may be complimentary with other components of the drive arrangement 33. For example, the roller width W may be equal to or greater than a width of load features of the drive sprocket assembly 40. In an embodiment, the roller width W is greater than each of the thin tooth load feature 74 and the thick tooth load feature 76.

The load chamfer 94 may have a width greater than the roller width W. For example, the load chamfer 94 may have a load chamfer minimum width P1 greater than the roller width W. The load chamfer 94 may also have a load chamfer maximum width P3 greater than the load chamfer minimum width P1. As such, the load chamfer 94 may be configured to funnel or guide the thick tooth load feature 74 towards the roller surface 69.

Figure 16:
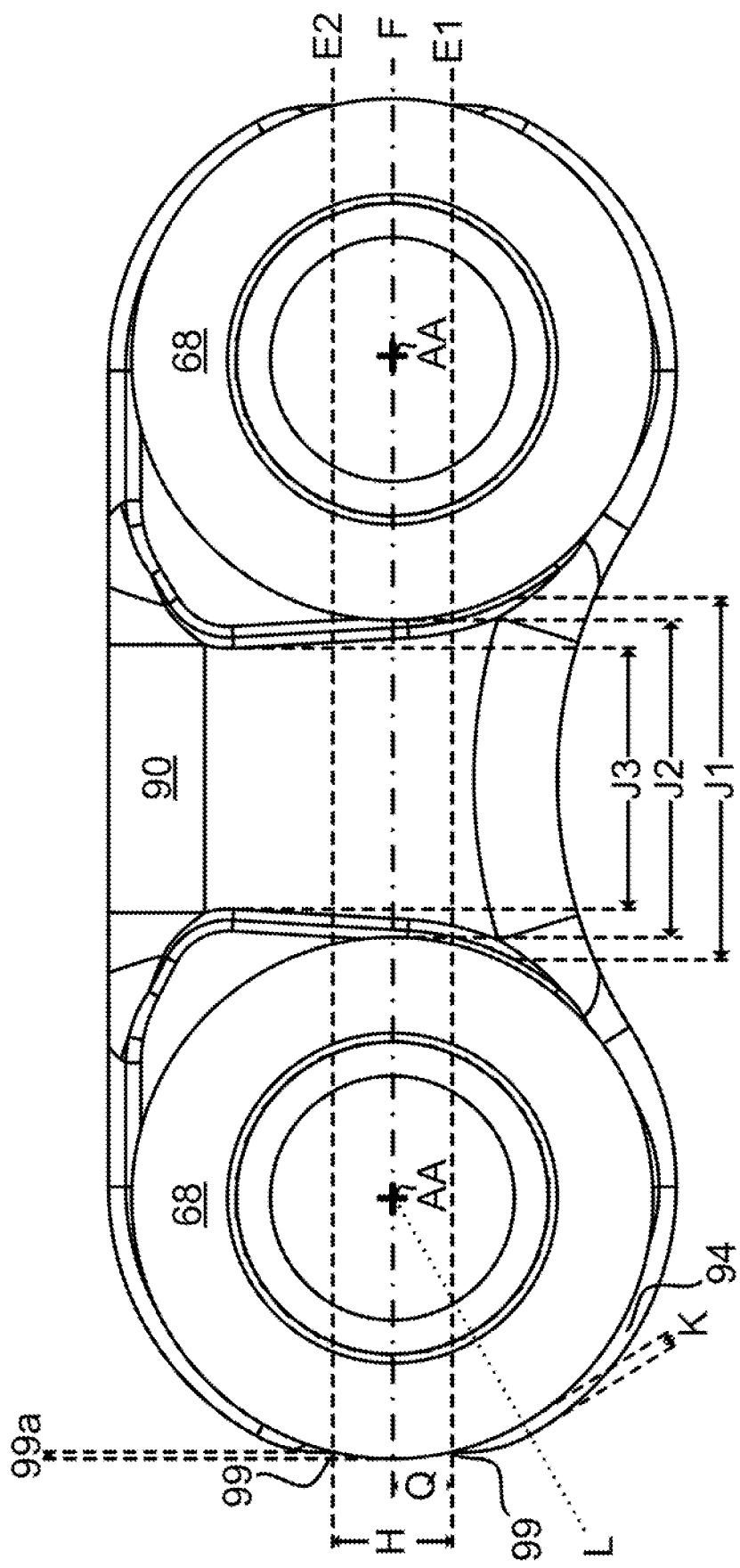
FIG. 16 is a sectional view of the inner link assembly of FIG. 15 taken along line 16-16.

At any point along the load chamfer 94, a load chamfer effective width P2 may be described as the width of the load chamfer 94 even with the extent of the roller surface 69 at that point. For example, a load chamfer length K as shown in FIG. 16 corresponds to the load chamfer maximum width P3 at its radially outboardmost point and to the load chamfer effective width P2 at its radially inboardmost point.

Referring again to FIG. 14, the inner link plates 90, 92 may each include an inner link edge 96. The inner link edge 96 may be configured to interact with other features of the drive arrangement 33, for example shifting features of the driven sprocket assembly 42 as discussed above. In an embodiment the inner link edge 96 has minimal or no axial dimension relative to the roller axis AA as the load chamfer 94 extends to the axially outboardmost point of the inner link edge 96.

The outer link plates 86, 88 may be provided with an outer link edge 98. The outer link edge 98 may be similarly configured to the inner link edge 96. For example, the outer link edge 98 may be configured to interact with shifting features of the driven sprocket assembly 42. In an embodiment, the inner link edge includes the external chamfer 67.

Figure 15:
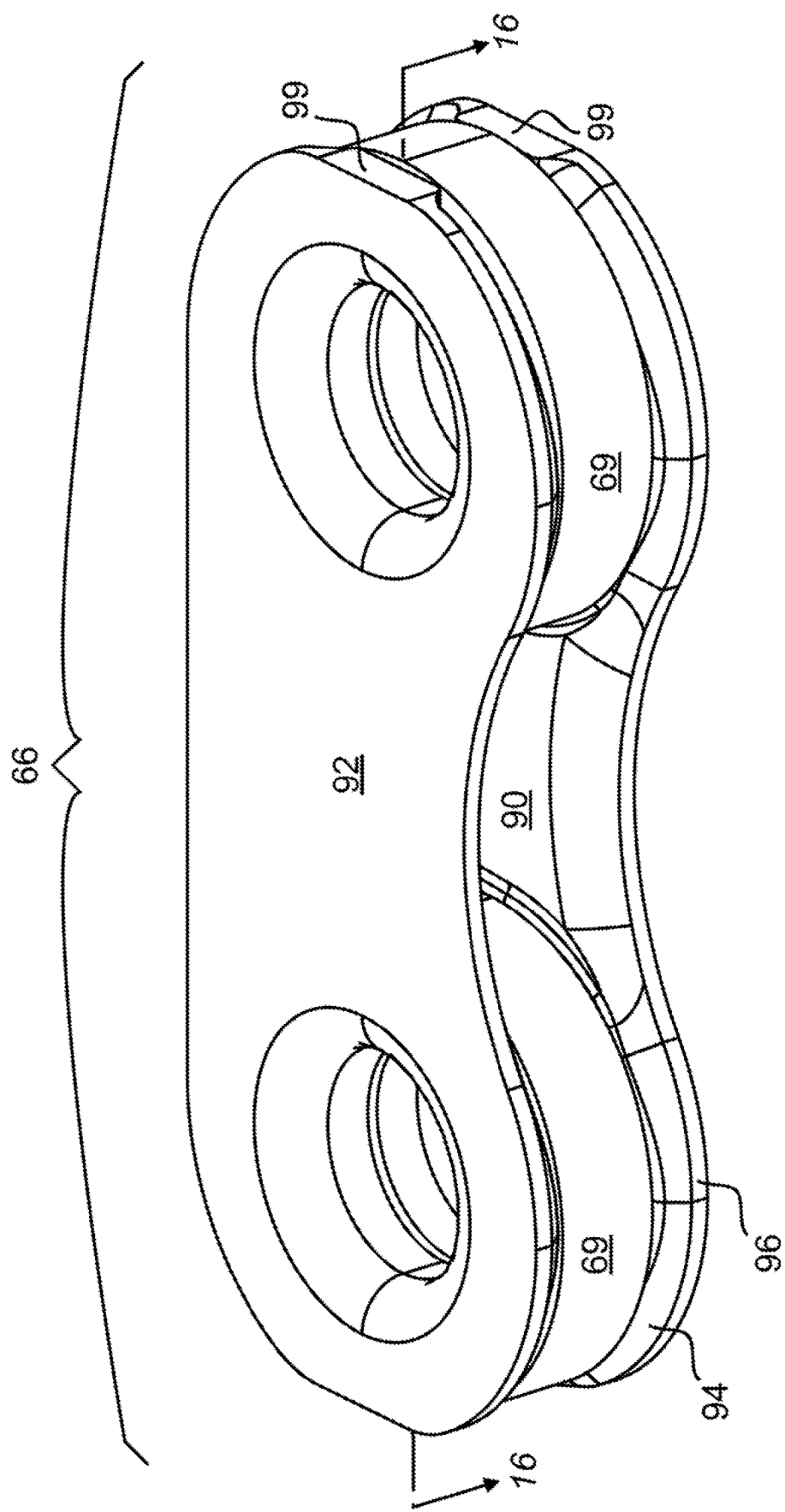
FIG. 15 is an isometric view of an inner link assembly of the chain of FIG. 13A.

FIG. 15 is an isometric view of the inner link assembly of the chain of FIG. 13A. The load chamfer 94 has a contour shown to broadly follow the circumference of the roller 68. The load chamfer 94 may extend beyond the roller surface 69 by various distances depending on the point at which the distance is measured along a line extending radially from the roller axis AA.

FIG. 16 is a sectional view of the inner link assembly 66 of FIG. 15 taken along line 16-16. The longitudinal roller centerline F of the inner link assembly 66 is shown passing through the roller axis C of an inner link pair of the rollers 68. The longitudinal roller centerline may also define a third radial direction towards the clearance feature 99 and along which the roller 68 protrudes past the clearance feature 99. A roller protrusion 99a may be defined as a distance the roller surface 69 protrudes past the clearance feature 99.

A clearance feature lower extent E1 is shown below the longitudinal roller centerline F. The clearance feature lower extent E1 defines a lowermost point at its intersection with the clearance feature 99. The clearance feature lower extent E1 is displaced from the longitudinal roller centerline F by a clearance feature offset Q defining a distance of a lowermost point of the clearance feature 99.

A clearance feature upper extent E2 is shown above the longitudinal roller centerline F. The clearance feature upper extent E2 defines an uppermost point at its intersection with the clearance feature 99. Between the clearance feature upper extent E2 and the clearance feature lower extent E1 a clearance feature height is defined. The clearance feature upper extent E2 may be displaced from the longitudinal roller centerline F by the clearance feature offset Q. Alternatively, the clearance feature upper extent E2 may be disposed closer to or further away from the longitudinal roller centerline F than is the clearance feature lower extent E1. In an embodiment, the clearance feature upper extent E2 is even with the longitudinal roller centerline F and the entire extent of the clearance feature 99 is even with or below the longitudinal roller centerline F.

A second radial direction line L is shown in FIG. 16 extending from the roller axis AA. Along the second radial direction line L the load chamfer length K is measured as discussed above. The second radial direction line L extends to meet the thick tooth contact point 73 of the thick tooth load feature 76 so that the load chamfer length K is a measurement of how far beyond the thick tooth load feature 76 the load chamfer 94 extends in the second radial direction line L.

Various intra-roller distances will now be described. Intra-roller distances may be uniform among the outer link assembly 64 and the inner link assembly 66. A first intra-roller distance J1 is described at a radial height of the thick tooth contact point 73. The first intra-roller distance J1 describes the distance between which various lengths of the teeth 60, 62 may be accommodated.

A second intra-roller distance J2 is described along the longitudinal roller centerline F. The second intra-roller distance J2 is at a point of maximum roller width and a point of minimum intra-roller distance.

An intra-recess minimum distance J3 may also be provided. For example, the intra-recess minimum distance J3 may describe a minimum gap between recess features between which the teeth 60, 62 may be configured to engage.

Figures 17A, 17B:
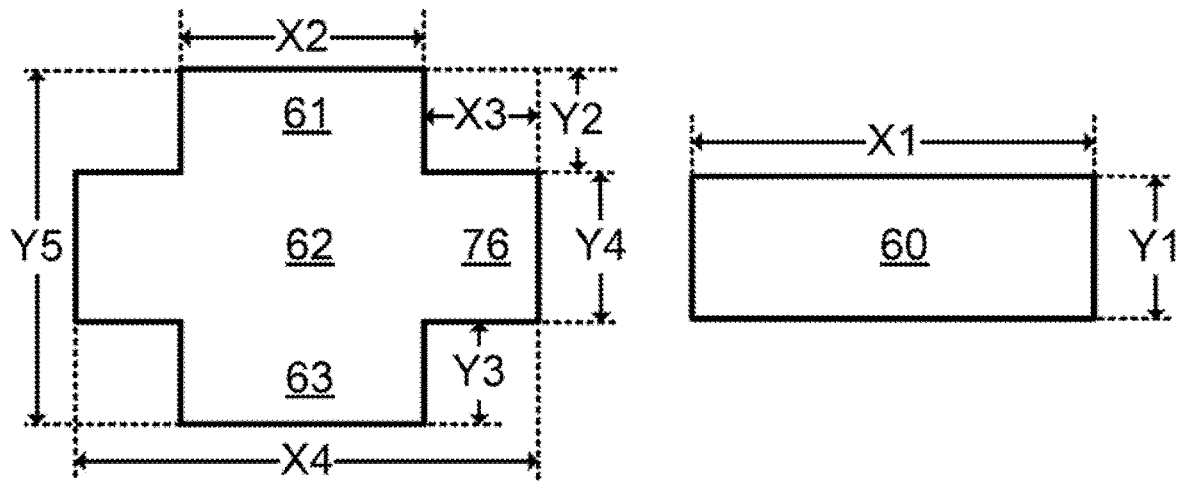
FIG. 17A is a sectional schematic view of a thick tooth of the drive sprocket of FIG. 9 taken along line 17A-17A.
FIG. 17B is a sectional schematic view of a thin tooth of the drive sprocket of FIG. 9 taken along line 17B-17B.

FIG. 17A is a sectional schematic view of a thick tooth 62 of the drive sprocket assembly 40 of FIG. 9 taken along line 17A-17A. The views of FIGS. 17A-D correspond to a circumference below the first radial height R1 of the thick tooth load feature radially outermost extent 77 at the radial height of the thick tooth contact point 73. At this radial height, the thick tooth 62 may be described with respect to its sectional dimensions.

The thick tooth inboard protrusion 61 has a first inboard axial protrusion width Y2. The thick tooth outboard protrusion 63 has a first outboard axial protrusion width Y3. The length of the thick tooth protrusions 61, 63 may be described by a first axial protrusion length X2.

The thick tooth load feature 76 has a first load feature width Y4. The thick tooth load feature 76 also has a first load feature length X3.

The thick tooth 62 has a first thick tooth maximum width Y5. The first thick tooth maximum width Y5 may be described as a sum of the first inboard axial protrusion width Y2, the first outboard axial protrusion width Y3, and the first load feature width Y4. The thick tooth also has a first thick tooth maximum length X4.

FIG. 17B is a sectional schematic view of the thin tooth 60 of the drive sprocket assembly 40 of FIG. 9 taken along line 17B-17B. The thin tooth 60 has a first thin tooth width X1 and a first thin tooth length Y1. The first thin tooth width Y1 may be equal to the first load feature width Y4. The first thin tooth length X1 may be equal to the first thick tooth maximum length X4.

Figure 17C:
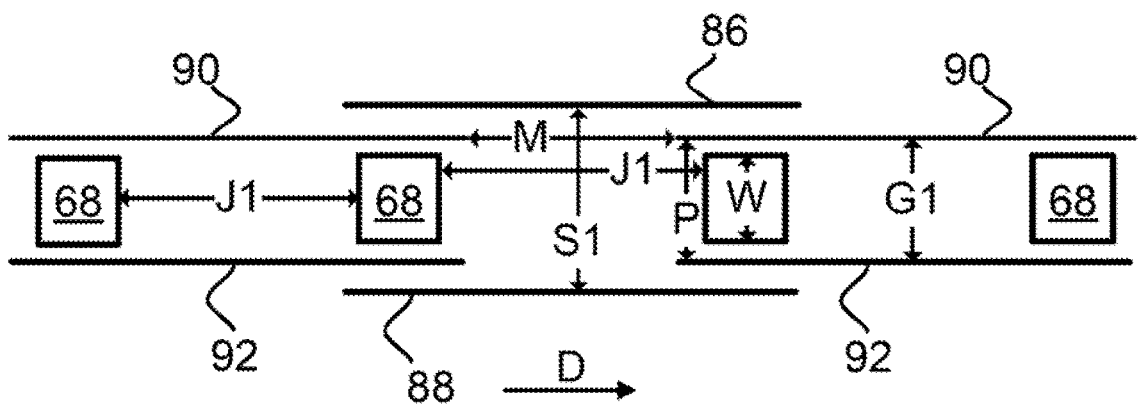
FIG. 17C is a sectional schematic view of the chain of FIG. 13A along line 17C-17C and corresponding to the sectional schematic views of FIG. 17A and FIG. 17B.
Figure 17D:
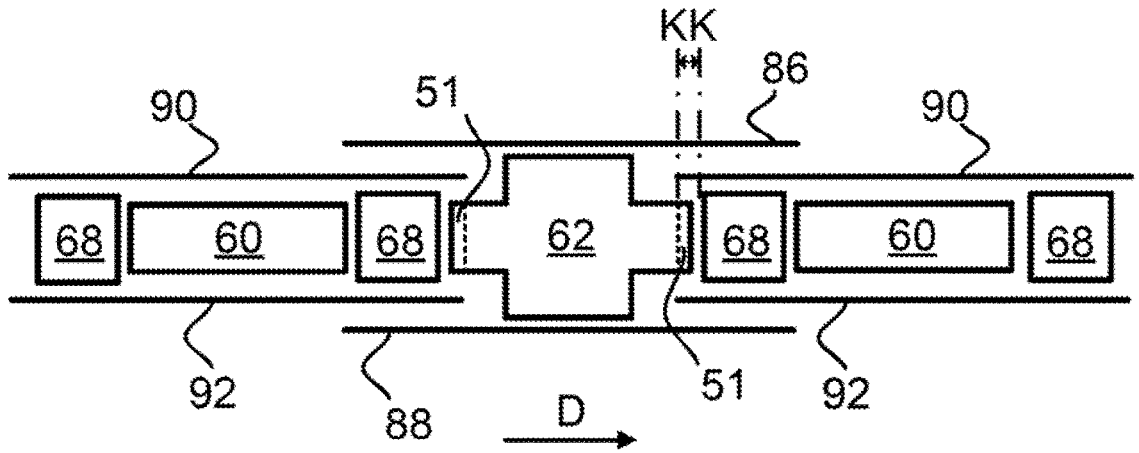
FIG. 17D is the sectional schematic view of FIG. 17C combined with the sectional schematic view of FIG. 17A and FIG. 17B.

FIG. 17C is a sectional schematic view of the chain 44 of FIG. 13A taken along line 17C-17C and corresponding to the sectional schematic views of FIG. 17A and FIG. 17B.

A first outer axial distance S1 is shown between inner faces of the inboard outer link plate 86 and the outboard outer link plate 88. The first outer axial distance S1 may be the same or greater than the outer axial distance S.

A first inner axial distance G1 is shown between inner faces of the inboard inner link plate 90 and the outboard inner link plate 92. The first inner axial distance G1 may be the same or greater than the inner axial distance G.

An intra-chamfer distance M is shown between opposed pairs of the inboard inner link plates 90 and may also be measured between opposed pairs of the outboard inner link plates 92. The intra-chamfer distance M may be compared with the first axial protrusion length X2 to determine a fill percentage of the first axial protrusion length X2. The fill percentage of the first axial protrusion length X2 may be equal to or substantially equal to other fill percentages. For example, the fill percentage of the first axial protrusion length X2 may be within 80-120% of one or more of the other length-based fill percentages shown and described. In an embodiment, the fill percentage of the first axial protrusion length X2 is within 90-110% of one or more of the other length-based fill percentages shown and described.

The first intra-roller distance J1 is shown as in FIG. 16. The first intra-roller distance J1 may be compared with the intra-chamfer distance M to calculate a longitudinal load chamfer length KK related to the load chamfer length K as shown in and described with reference to FIG. 16.

A load chamfer distance P is shown between the paired inboard and outboard inner link plates 90, 92 within the outer link space. The load chamfer distance P may be equal to the load chamfer effective width P2 as described above. The load chamfer distance P may be compared with the first load feature width Y4 to determine a fill percentage of the first load feature width Y4 within the load chamfer distance P. The fill percentage of the of the first load feature width Y4 within the load chamfer distance P may be equal to or substantially equal to other fill percentages. For example, this fill percentage may be within 80-120% of one or more of the other width-based fill percentages shown and described. In an embodiment, this fill percentage is within 90-110% of one or more of the other width-based fill percentages shown and described.

FIG. 17D is the sectional schematic view of FIG. 17C combined with the sectional schematic views of FIG. 17A and FIG. 17B.

The thick tooth 62 may have at least one of a tooth overlap portion 51. For example, the thick tooth load feature 76 may include the tooth overlap portion 51 defined as overlapping a space between a pair of the inboard and outboard inner link plates 90, 92. The tooth overlap portion 51 may also be included on an opposite side or trailing flank of the thick tooth 62. The overlap portion 51 of the thick tooth load feature 76 may be used in the determination of the fill percentage within the load chamfer distance P as described above with reference to FIG. 17C.

FIG. 18A is a sectional schematic view of the thick tooth 62 of the drive sprocket assembly 40 of FIG. 9 taken along line 18A-18A. The views of FIGS. 18A-D correspond to sectional views taken at the second radial height R2 of the roller axis AA during engagement of the roller 68 with the drive sprocket assembly 40.

The thick tooth 62 may be described with reference to its sectional dimensions at the second radial height R2. The thick tooth inboard protrusion 61 has a second inboard axial protrusion width Y7. The thick tooth outboard protrusion 63 has a second outboard axial protrusion width Y8. The length of the thick tooth protrusions 61, 63 may be described by a second axial protrusion length X6.

The thick tooth guiding tip 72 has a second feature width Y9. The thick tooth guiding tip 72 also has a second feature length X7.

The thick tooth 62 has a second thick tooth maximum width YY. The second thick tooth maximum width YY may be described as a sum of the second inboard axial protrusion width Y7, the second outboard axial protrusion width Y8, and the second feature width Y9. The thick tooth also has a second thick tooth maximum length X8.

FIG. 18B is a sectional schematic view of the thin tooth 60 of the drive sprocket assembly 40 of FIG. 9 taken along line 18B-18B. The thin tooth 60 has a second thin tooth width X5 and a second thin tooth length Y6. The second thin tooth width Y6 may be equal to the second feature width Y9. The second thin tooth length X5 may be equal to the second thick tooth maximum length X8.

Each of the dimensions of FIGS. 18A and 18B may be related to the dimensions of FIGS. 17A and 17B. For example, each of the second lengths and the second widths of the thick and thin teeth 62, 60 may be less than or equal to each of the corresponding ones of the first lengths and the first widths of the thick and thin teeth 62, 60. In an embodiment, each one of second dimensions is less than a corresponding first dimension.

FIG. 18C is a sectional schematic view of the chain 44 of FIG. 13A taken along line 18C-18C and corresponding to the sectional schematic views of FIG. 18A and FIG. 18B.

A second outer axial distance S2 is shown between inner faces of the inboard outer link plate 86 and the outboard outer link plate 88. The second outer axial distance S2 may be the same, greater than, or less than the outer axial distance S. In an embodiment, the second outer axial distance S2 is less than the first outer axial distance S1 of FIG. 17C.

A second inner axial distance G2 is shown between inner faces of the inboard inner link plate 90 and the outboard inner link plate 92. The second inner axial distance G2 may be the same, greater than, or less than the inner axial distance G. In an embodiment, the second inner axial distance G2 is less than the first inner axial distance G1.

A clearance distance N is shown between opposed pairs of the inboard inner link plates 90 at corresponding pairs of the clearance features 99. The clearance distance N may also be measured between opposed pairs of the outboard inner link plates 92. The clearance distance N may be compared with the second axial protrusion length X7 to determine a fill percentage of the second axial protrusion length X7. The fill percentage of the first axial protrusion length X2 may be equal to or substantially equal to other fill percentages. For example, the fill percentage of the second axial protrusion length X7 may be within 80-120% of one or more of the other length-based fill percentages shown and described. In an embodiment, the fill percentage of the second axial protrusion length X7 is within 90-110% of one or more of the other length-based fill percentages shown and described.

The second intra-roller distance J2 is shown as in FIG. 16. The second intra-roller distance J2 may be compared with the clearance distance N to calculate the roller protrusion 99a as shown in and described with reference to FIG. 16.

FIG. 18D is the sectional schematic view of FIG. 18C combined with the sectional schematic view of FIG. 18A and FIG. 18B.

The roller 68 is shown to overlap into the outer link space by a distance of the roller protrusion 99a. This distance may define a roller overlap portion 53 of the roller 68 into the outer link space.

Various fill percentages may be described with reference to FIGS. 17A-D and 18A-D, as above. In an embodiment, the first load feature length X3 fills between 10-40% of the first intra-roller distance J1. Also in an embodiment, the first load feature length X3 fills between 20-30% of the first intra-roller distance J1. The percentage fill of the first load feature length X3 within the first intra-roller distance J1 may correspond to a size and/or wear life of the thick tooth load feature 76.

The second feature length X7 may fill less of the second intra-roller distance J2 than the first load feature length X3 fills of the first intra-roller distance J1. For example, the second feature length X7 may fill less than 20% of the second intra-roller distance J2. In an embodiment, the second feature length X7 fills less than or equal to 10% of the second intra-roller distance J2.

The first axial protrusion length X2 may fill a greater percentage of the first intra-roller distance J1 than does the first load feature length X3. For example, the first axial protrusion length X2 may fill between 30-60% of the first intra-roller distance J1. In an embodiment, the first axial protrusion length X2 is within 35-50% of the first intra-roller distance J1.

The second thick tooth maximum width YY may be configured to fill at least 70% of the second outer axial distance S2. In an embodiment, the second thick tooth maximum width is configured to fill at least 80% of the second outer axial distance S2. Also in an embodiment, the second thick tooth maximum width is configured to fill at least 85% of the second outer axial distance S2.

The second thin tooth width Y6 may be configured to fill at least 70% of the second inner axial distance G2. In an embodiment, the second thin tooth width is configured to fill at least 80% of the second inner axial distance G2. Also in an embodiment, the second thin tooth width is configured to fill at least 85% of the second inner axial distance G2.

At least a sectional portion of the thick tooth load feature 76 may be configured to fill at least 70% of the load chamfer distance P. In an embodiment, the first load feature width Y4 fills at least 70% of the load chamfer effective width P2. Also in an embodiment, the thick tooth load feature 76 fills at least 75% of the load chamfer distance P. Also in an embodiment, the thick tooth load feature 76 fills at least 80% of the load chamfer distance P. The thick tooth load feature 76 may be configured to fill similar percentages of the inner axial distance G.

As described above, the percentage fill of the width of the thick tooth 62 may be related to the percentage fill of the width of the thick tooth load feature 76. For example, the percentage fill of the first load feature width Y4 within the load chamfer distance P may be within 80-120% of the percentage fill of the first thick tooth maximum width Y5 within the first outer axial distance S1. In an embodiment, the percentage fill of the first load feature width Y4 within the load chamfer distance P is within 90-110% of the percentage fill of the first thick tooth maximum width Y5 within the first outer axial distance S1. Also in an embodiment, these percentage fills are equal.

FIG. 19 is a sectional schematic view of the gear changer 48 of an embodiment of the drive arrangement 33. The rear gear changer 48 may be attached to the frame 25 with a linkage 55, such as a parallelogram linkage. The rear gear changer may include the guide pulley 54 and the tension pulley 56. The tension pulley 56 may be constrained at a set radial distance from the guide pulley 54 relative to the tensioning axis T with a cage 57.

The rear gear changer 48 may be controllable in the tensioning direction T1 and the detensioning direction T2. In an embodiment, the rear gear changer 48 is configured for relatively free movement in the tensioning direction T1 and relatively restricted movement in the detensioning direction T2. For example, a clutch or damper may be employed to control movement of the rear gear changer 48. In such a way, tension on the lower chain segment 44b may be maintained over large shocks caused by rough terrain while still allowing relatively small and/or slow shifting motions.

The rear gear changer 48 may include a fluid damper assembly 37. The fluid damper assembly 37 may be configured to control movement of the tension pulley 56 in the tensioning direction T1 and the detensioning direction T2. For example, the fluid damper assembly 37 may be configured with a first chamber 47 and a second chamber 49 communicating across one or more flow paths. In an embodiment, fluid communication from the second chamber 49 to the first chamber 47 is less restricted than fluid communication from the first chamber 47 to the second chamber 49. For example, a flow rate for communication from the second chamber 49 to the first chamber 47 may be greater than a flow rate for communication from the first chamber 47 to the second chamber 49. In an embodiment, a valve 43 is provided to facilitate flow from the second chamber 49 to the first chamber 47. The valve 43 may be sprung.

The drive arrangement 33 may be provided with any of the features and elements as shown and described. The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A drive arrangement for a bicycle comprising:
    a crank rotatable about a crank axis and having a crank mounting portion;
    a drive sprocket, comprising:
        a sprocket mounting portion attached to the crank mounting portion;
        a chain engaging portion, comprising:
            a plurality of thin teeth;
            a plurality of thick teeth, each of the plurality of thick teeth comprising:
                a load feature;
                a guiding tip disposed radially outward of the load feature; and
                a recess area bounded by:
                    a line extending in a first radial direction from the crank axis through a radially outermost extent of the load feature;
                    a circumference defined by a radial distance of a radially outermost extent of the guiding tip from the crank axis; and
                    an outer profile of the guiding tip between the radially outermost extent of the load feature and the radially outermost extent of the guiding tip; and
    a chain configured to engage with the chain engaging portion of the drive sprocket, the chain comprising:
        a plurality of outer link plates;
        a plurality of rollers, each of the plurality of rollers disposed axially between a pair of the plurality of outer link plates relative to a roller axis; and
        a plurality of inner link plates disposed axially between the plurality of outer link plates and the plurality of rollers relative to the roller axis, wherein each of the plurality of inner link plates comprises:
            a load chamfer sized and shaped to extend beyond a corresponding one of the plurality of rollers beyond the load feature of the corresponding one of the plurality of thick teeth in a second radial direction relative to the roller axis during drivetrain engagement; and
            a clearance feature sized and shaped to allow the corresponding one of the plurality of rollers to align with or protrude past the clearance feature in a third radial direction of the load chamfer relative to the roller axis during drivetrain engagement.

2. The drive arrangement of claim 1, wherein at a low radial height of a load contact area relative to the crank axis a first load feature length is within 20-30% of a first intra-roller distance of the plurality of rollers at the low radial height during drivetrain engagement.

3. The drive arrangement of claim 2, wherein at a high radial height of a roller centerline during drivetrain engagement relative to the crank axis a second load feature length is less than or equal to 10% of a second intra-roller distance of the plurality of rollers at the high radial height.

4. The drive arrangement of claim 2, wherein at the low radial height an axial protrusion of one of the plurality of thick teeth has a first protrusion length within 35-50% of the first intra-roller distance.

5. The drive arrangement of claim 1, wherein at a high radial height a first axial protrusion and a second axial protrusion of the plurality of thick teeth describe a thick tooth maximum width of the plurality of thick teeth, the thick tooth maximum width filling at least 70% of an outer axial distance defined between a first paired outer link plate and a second paired outer link plate of the plurality of outer link plates.

6. The drive arrangement of claim 5, wherein at the high radial height the plurality of thin teeth have a maximum thin width filling at least 70% of an inner axial distance defined between a first paired inner link plate and a second paired inner link plate of the plurality of inner link plates.

7. The drive arrangement of claim 1, further comprising a clearance area bounded by:
    a tangent line described by an uppermost point and a lowermost point of the clearance feature;
    a circumference defined by a radial distance of a radially outermost extent of the guiding tip from the crank axis; and
    an outer profile of the guiding tip between the intersection of the tangent line with the load feature and the radially outermost extent of the guiding tip;
    wherein the clearance area is greater than the recess area.

* * * * *